(12) United States Patent
Akuzawa et al.

(10) Patent No.: US 12,447,935 B2
(45) Date of Patent: Oct. 21, 2025

(54) BRAKE PEDAL DEVICE AND BRAKE SYSTEM

(71) Applicant: DENSO CORPORATION, Kariya (JP)

(72) Inventors: Hiroyuki Akuzawa, Kariya (JP);
Toshiaki Yanagi, Kariya (JP);
Takamitsu Kubota, Kariya (JP);
Yoshinori Inuzuka, Kariya (JP)

(73) Assignee: DENSO CORPORATION, Kariya (JP)

( * ) Notice: Subject to any disclaimer, the term of this patent is extended or adjusted under 35 U.S.C. 154(b) by 47 days.

(21) Appl. No.: 18/587,563

(22) Filed: Feb. 26, 2024

(65) Prior Publication Data
US 2024/0190398 A1    Jun. 13, 2024

Related U.S. Application Data

(63) Continuation of application No. PCT/JP2022/010888, filed on Mar. 11, 2022.

(30) Foreign Application Priority Data

Sep. 1, 2021   (JP) ................ 2021-142749

(51) Int. Cl.
| | |
|---|---|
| B60T 7/04 | (2006.01) |
| G01B 7/30 | (2006.01) |
| G01D 5/20 | (2006.01) |
| G01R 33/06 | (2006.01) |

(52) U.S. Cl.
CPC ............ B60T 7/042 (2013.01); G01B 7/30 (2013.01); G01D 5/202 (2013.01); G01R 33/06 (2013.01)

(58) Field of Classification Search
CPC . B60T 7/042; B60T 7/04; B60T 17/18; G01B 7/30; G01B 7/00; G01D 5/202; G01R 33/06; G05G 1/30; G05G 1/38; G05G 1/44
See application file for complete search history.

(56) References Cited

U.S. PATENT DOCUMENTS 5,954,407 A    9/1999   Schramm

FOREIGN PATENT DOCUMENTS

| JP | 2001109532 A | * | 4/2001 |
|---|---|---|---|
| JP | 2018043674 A |   | 3/2018 |

\* cited by examiner

*Primary Examiner* — Lindsay M Low
*Assistant Examiner* — Charles J Brauch
(74) *Attorney, Agent, or Firm* — Nixon & Vanderhye P.C.

(57) ABSTRACT

A brake pedal device includes: a housing fixed to a vehicle; a brake pedal provided to be swingable about a predetermined axis with respect to the housing and to receive a depression operation of a driver; and at least three sensors that output signals according to an operation amount of the brake pedal. The at least three sensors include at least one magnetic sensor and at least two inductive sensors, for example. The at least two inductive sensors are spaced apart from each other such that a movement of a target metal of one inductive sensor is detected by a sensing coil of the one inductive sensor but a movement of a target metal of any other inductive sensors is not detected by the sensing coil of the one inductive sensor.

15 Claims, 16 Drawing Sheets

BRAKE PEDAL DEVICE AND BRAKE SYSTEM

CROSS REFERENCE TO RELATED APPLICATION

The present application is a continuation application of International Patent Application No. PCT/JP2022/010888 filed on Mar. 11, 2022, which designated the U.S. and claims the benefit of priority from Japanese Patent Application No. 2021-142749 filed on Sep. 1, 2021. The entire disclosures of all of the above applications are incorporated herein by reference.

TECHNICAL FIELD

The present disclosure relates to a brake pedal device and a brake system.

BACKGROUND

Conventionally, a brake-by-wire system is known, in which an electronic control unit (i.e., controller) detects an amount of operation of a brake pedal and controls a brake circuit for braking a vehicle based on an output signal of a pedal sensor that outputs a signal corresponding to the amount of operation of the brake pedal by a driver.

SUMMARY

According to an aspect of the present disclosure, in a brake pedal device used for a brake system or in a brake system, a plurality of inductive sensors are spaced from each other such that a movement of a target metal of one inductive sensor is detected by a sensing coil of the one inductive sensor but a movement of a target metal of any other inductive sensors is not detected by the sensing coil of the one inductive sensor.

Accordingly, it is possible to ensure redundancy of output signals of the inductive sensors and to accurately detect a pedal operation amount.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
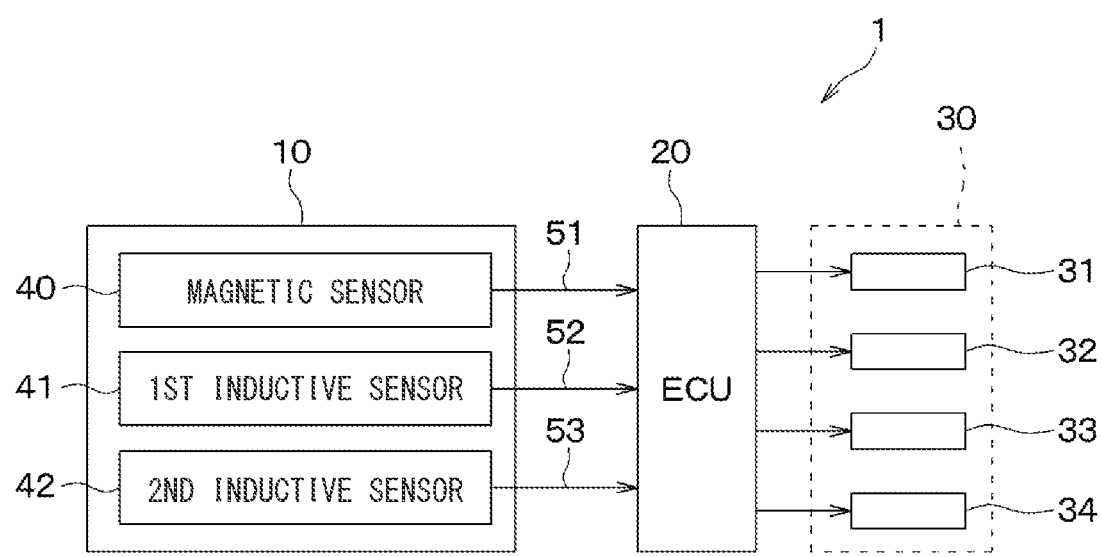
FIG. 1 is a block diagram of a schematic configuration of a brake system according to a first embodiment.

In the following description, an electronic control unit may be called as an "ECU," an amount of operation of a brake pedal may be called as a "pedal operation amount," and a brake-by-wire system may be called as a "brake system." ECU is an abbreviation of Electronic Control Unit as a controller.

A brake system may employ an electric brake as an example of a brake circuit. An electric brake includes an electric motor that is driven by an electric current supplied from a motor driver in the ECU, a linear motion mechanism that converts a torque output by the electric motor into a linear motion and presses a friction member against a brake rotor of each wheel, and the like.

The ECU included in the brake system of the above example detects the pedal operation amount based on the output signal of the pedal sensor, and converts it into a target value of a pressing force of the linear motion mechanism of the electric brake. The ECU then compares the output signal of a pressing force sensor that detects the pressing force of the linear motion mechanism with the target value of the pressing force of the linear motion mechanism, and feedback-controls an electric current value supplied from the motor driver to the electric motor.

This brake system is provided with an electric current sensor that detects the electric current value supplied from the ECU to the electric motor, and an angle sensor that detects a rotation angle of the electric motor. When the pressing force sensor fails, the ECU is configured to control the electric current supplied from the ECU to the electric motor based on the output signal of the electric current sensor and the output signal of the angle sensor to drive the electric brake. Further, the ECU is also configured to check the driving accuracy of the electric brake based on the output signal of the electric current sensor and the output signal of the angle sensor when the vehicle is stopped.

However, in the brake system of the above example, the system is built on the premise that a normal signal indicating a correct pedal operation amount is input to the ECU from a pedal sensor provided in the brake pedal device (hereinafter, the pedal sensor is simply referred to as "sensor"). If an abnormal signal indicating an incorrect pedal operation amount is input from the sensor to the ECU, the ECU detects the incorrect pedal operation amount based on the abnormal signal and drives the electric brake, thereby causing a problem that it becomes impossible to reliably brake the vehicle.

Therefore, in the brake-by-wire system, it is important for the ECU to accurately detect the pedal operation amount by the driver in order to reliably brake the vehicle. Further, in the brake-by-wire system, it is preferable that the ECU detects the pedal operation amount using the output signals of three or more sensors in order to ensure the redundancy of the output signals of the sensors. In such manner, even if an abnormal signal is input to the ECU due to the failure of one sensor, the ECU can determine a normal signal by taking a majority decision based on the signal from the one failed sensor and the signals from the remaining two sensors.

However, even if three or more sensors are provided in the brake pedal device, if a plurality of sensors fail at the same time due to the same cause of failure, the ECU may not be able to determine a normal signal by the above-described majority decision. Therefore, in order to ensure redundancy with three or more sensors, it is necessary to take measures to prevent multiple sensors from simultaneously failing due to the same cause of failure.

Further, candidate sensors for measuring the pedal operation amount may be considered to include (i) a contact-type pressure sensor that directly measures the force applied to the brake pedal by the driver by contacting the brake pedal, or (ii) a non-contact sensor, in various types, that measures a swing angle of the brake pedal. However, using a contact-type sensor for the brake pedal device, which is frequently used when driving a vehicle, incurs problems such as (i) deterioration of a detection part of the sensor causing a decrease in detection accuracy, (ii) higher price and larger volume of the sensor for ensuring the reliability, and the like. Furthermore, the pressure sensor may have other problem such that the detection accuracy of the sensor lowers unless the driver's pedaling force is uniformly applied to the piezoelectric element. Therefore, as a sensor for measuring the pedal operation amount, it is preferable to adopt a non-contact sensor instead of a contact-type sensor.

Examples of non-contact sensors include magnetic sensors that use the state of magnetism (specifically Hall sensors, magnetoresistive sensors, etc.), inductive sensors that use electromagnetic induction of coils, and photoelectric sensors that use the amount of light. Among the above examples, the photoelectric sensor may cause a problem that the amount of light is reduced in the presence of dust or oil, resulting in erroneous detection, and is thus not suitable for vehicular use such as a brake pedal device.

A magnetic sensor is a sensor that detects changes in magnetism inside the sensor. Therefore, if a foreign object with magnetism approaches the proximity of the magnetic sensor, there is a risk of erroneous detection. In an in-vehicle environment where a brake pedal device is installed, it is difficult to imagine how close a foreign object with magnetism is brought to the sensor. Therefore, if all of the three sensors are implemented as magnetic sensors, there is a risk that the three sensors will all fail together when a magnetic foreign object approaches. Therefore, it is impossible to employ magnetic sensors for all three sensors.

Also, even if two of the three sensors are magnetic sensors, if the two magnetic sensors fail at the same time due to the approach of a magnetic foreign object, the ECU will not be able to determine the normal signal by majority decision. Therefore, it is not possible to use magnetic sensors for two of the three sensors.

It is an object of the present disclosure to provide a brake pedal device and a brake system that enable accurate detection of a pedal operation amount by using three or more sensors.

According to one aspect of the present disclosure, a brake pedal device is used for a brake system in which an electronic control unit is configured to detect an operation amount of a brake pedal based on an output signal of a sensor group provided in the brake pedal device, and to control a drive of a brake circuit. The brake pedal device includes: a housing to be fixed to a vehicle; the brake pedal provided to be swingable about a predetermined axis with respect to the housing, and to receive a depression operation of a driver; and at least three sensors configured to output signals according to the operation amount of the brake pedal. The at least three sensors include at least one magnetic sensor and at least two inductive sensors, the magnetic sensor includes a magnetic circuit configured to operate together with the brake pedal, and a magnetic detector configured to detect changes in a magnetic field generated by the magnetic circuit, and each of the at least two inductive sensors includes a target metal that moves together with the brake pedal, and a sensing coil configured to detect a movement of the target metal. In addition, the at least two inductive sensors are spaced from each other such that the movement of the target metal of one inductive sensor is detected by the sensing coil of the one inductive sensor but the movement of the target metal of any other inductive sensors is not detected by the sensing coil of the one inductive sensor.

According to the above, the brake pedal device is configured to detect the operation amount of the brake pedal by a plurality of non-contact sensors having respectively different detection principles, such as the magnetic sensor and the inductive sensors. Therefore, even if the output signal of one sensor becomes abnormal due to a disturber such as a magnetic foreign object or a conductive foreign object brought close to the sensor, regarding which each sensor is not good at handling, the output signals of the other sensors can be maintained normally. Therefore, this brake pedal device can accurately detect the pedal operation amount by ensuring the redundancy of the output signals of the sensors and by taking a majority decision from the output signals of the at least three sensors in the electronic control unit.

Specifically, the inductive sensor is a sensor that detects the position of the target metal at a predetermined distance from the sensing coil using electromagnetic induction of the coil. In this case, when a conductive foreign object (that is, a metallic foreign object) other than the target metal approaches the inductive sensor, there is a risk of erroneous detection. In contrast, according to the one aspect of the present disclosure, the at least three sensors include at least two inductive sensors. Therefore, even if a conductive foreign object intrudes into a space between the sensing coil of one inductive sensor and the target metal, the output signals of the other inductive sensors can be maintained normal. Thus, the brake pedal device can prevent simultaneous failure of a plurality of inductive sensors, thereby ensuring redundancy of output signals of the sensors and accurately detecting the pedal operation amount in the electronic control unit.

Also, the magnetic sensor is a sensor that detects a change in the magnetic field generated by the magnetic circuit with the magnetic detector. Therefore, if the brake pedal device is provided with a plurality of magnetic sensors, there is a possibility that the plurality of magnetic sensors may simultaneously perform erroneous detection when a magnetic foreign object approaches the surroundings of the plurality of magnetic sensors. In contrast, according to the one aspect of the present disclosure, the at least three sensors include at least one magnetic sensor and at least two inductive sensors. Therefore, even if the magnetic sensor fails due to a magnetic foreign object brought close to the sensor, the output signals of the at least two inductive sensors can be maintained normal. Thus, this brake pedal device ensures the redundancy of the output signals of the sensor, and can accurately detect the pedal operation amount in the electronic control unit.

Further, according to an another aspect of the present disclosure, a brake pedal device can be used for a brake system in which an electronic control unit is configured to detect an operation amount of a brake pedal based on an output signal of a sensor group provided in the brake pedal device, and is configured to control a drive of a brake circuit. The brake pedal device includes: a housing to be fixed to a vehicle; a brake pedal provided to be swingable about a predetermined axis with respect to the housing and to receive a depression operation of a driver; and at least three sensors configured to output signals according to the operation amount of the brake pedal. The at least three sensors include at least three inductive sensors. Each of the at least three inductive sensors includes a target metal that moves together with the brake pedal, and a sensing coil configured to detect a movement of the target metal. In addition, the at least three inductive sensors are spaced from each other such that the movement of the target metal of one inductive sensor is detected by the sensing coil of the one inductive sensor but the movement of the target metal of any other inductive sensors is not detected by the sensing coil of the one inductive sensor.

According to the above, by arranging a plurality of the inductive sensors apart from each other, even if a conductive foreign object intrudes into a space between the sensing coil of one inductive sensor and the target metal, the output signals of the at least two other inductive sensors can be maintained normal. That is, by increasing the distance between the plurality of inductive sensors to be larger than a predetermined distance, it is possible to prevent the simultaneous failure of the plurality of inductive sensors due to the conductive foreign object. Therefore, this brake pedal device ensures the redundancy of the output signals of the sensor, and can accurately detect the pedal operation amount in the electronic control unit.

According to a further another aspect of the present disclosure, a brake system is configured to drive and control a brake circuit that performs braking of a vehicle. The brake system includes a brake pedal device, at least three sensors and a controller. The brake pedal device includes: a housing to be fixed to the vehicle; a brake pedal provided to be swingable about a predetermined axis with respect to the housing, and to be pedaled by a driver; and at least three sensors configured to output signals according to an operation amount of the brake pedal. The controller is configured to detect the operation amount of the brake pedal based on output signals of the at least three sensors and to drive and control the brake circuit. The at least three sensors include (i) at least one magnetic sensor and at least two inductive sensors, or (ii) at least three inductive sensors. In addition, the inductive sensors are spaced from each other such that a movement of a target metal of one inductive sensor is detected by a sensing coil of the one inductive sensor but a movement of a target metal of any other inductive sensors is not detected by the sensing coil of the one inductive sensor.

According to the above, the brake system according to the further another aspect of the present disclosure also ensures the redundancy of the output signals of the sensors in the same way as the brake system according to the one aspect or the another aspect of the present disclosure described above, and can accurately detect the pedal operation amount in the controller.

Embodiments of the present disclosure will now be described with reference to the drawings. In the following embodiments, the same or equivalent parts are denoted by the same reference numerals as each other, and the explanation of the same or equivalent parts will be omitted.

First Embodiment

The following describes the first embodiment. First, a configuration of the brake system according to the first embodiment will be described. As shown in FIG. 1, a brake system 1 of the first embodiment is a brake-by-wire system including a brake pedal device 10, an electronic control unit 20 (hereinafter referred to as "ECU 20"), a brake circuit 30, and the like. The brake-by-wire system is a system, in which the ECU 20 detects an operation amount of a brake pedal (hereinafter referred to as "pedal operation amount") based on output signals from a plurality of sensors provided in the brake pedal device 10, and drive-controls the brake circuit 30 and brakes wheels.

The brake pedal device 10 of the first embodiment includes one magnetic sensor 40 and two inductive sensors 41 and 42 as a plurality of sensors that output signals according to the pedal operation amount. In the following description, one of the two inductive sensors 41 and 42 is called as a first inductive sensor 41 and the other inductive sensor is called as a second inductive sensor 42.

The magnetic sensor 40 and the ECU 20 are connected by a first signal line 51. A second signal line 52 connects the first inductive sensor 41 and the ECU 20. A third signal line 53 connects the second inductive sensor 42 and the ECU 20. Therefore, the output signal of one magnetic sensor 40 and the output signals of the two inductive sensors 41 and 42 are configured to be input to the ECU 20, respectively. Note that the first to third signal lines 51 to 53 are configured by wire harnesses or a predetermined in-vehicle LAN (Local Area Network), for example. Specific configurations of the brake pedal device 10 and the three sensors will be described later.

The ECU 20 includes a microcomputer including a processor that performs control processing and arithmetic processing, storage units such as ROM and RAM that store programs and data, and peripheral circuits thereof. The storage unit includes non-transitory, tangible storage media. The ECU 20 performs various control processing and arithmetic processing based on the programs stored in the storage unit, and controls the operation of each device connected to an output port. Specifically, the ECU 20 detects an accurate pedal operation amount based on the output signals of the three sensors 40 to 42 described above, and drive-controls the brake circuit 30. A method of detecting the pedal operation amount performed by the ECU 20 will be described later.

Electric brakes 31 to 34, for example, are used as the brake circuit 30 in the first embodiment. The electric brakes 31 to 34 are mechanisms that brake each wheel by driving electric motors according to instructions from the ECU 20 and pressing brake pads against disc brake rotors.

Next, configurations of the brake pedal device 10 and the three sensors 40 to 42 of the first embodiment will be described with reference to FIGS. 2 to 7. In the first embodiment, an organ-type brake pedal device will be described as an example of the brake pedal device 10. The organ-type brake pedal device is a device in which a portion of a brake pedal 60 that is stepped on by a driver is arranged above an axial center CL of swing in a vertical direction when mounted on a vehicle. Note that the three-dimensional coordinates shown in FIGS. 2 to 6 indicate a position along the vertical direction, the front-rear direction, and the left-right direction when the brake pedal device 10 is mounted on the vehicle.

As shown in FIGS. 2 to 6, the brake pedal device 10 includes a housing 70, the brake pedal 60, two inductive sensors 41 and 42, one magnetic sensor 40, and the like.

Figure 2:
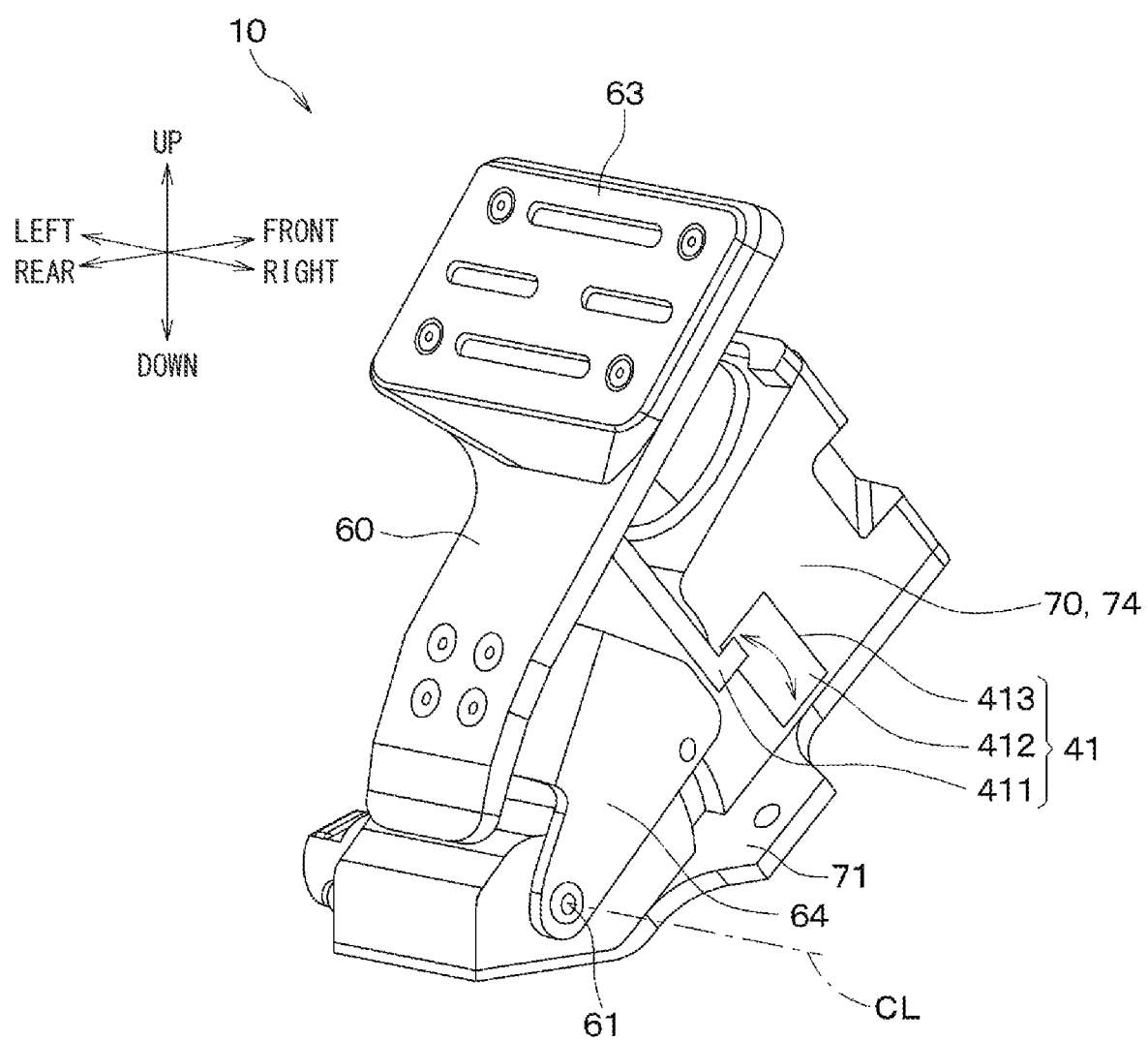
FIG. 2 is a perspective view of the brake pedal device seen from a right side, which is provided in the brake system according to the first embodiment.
Figure 3:
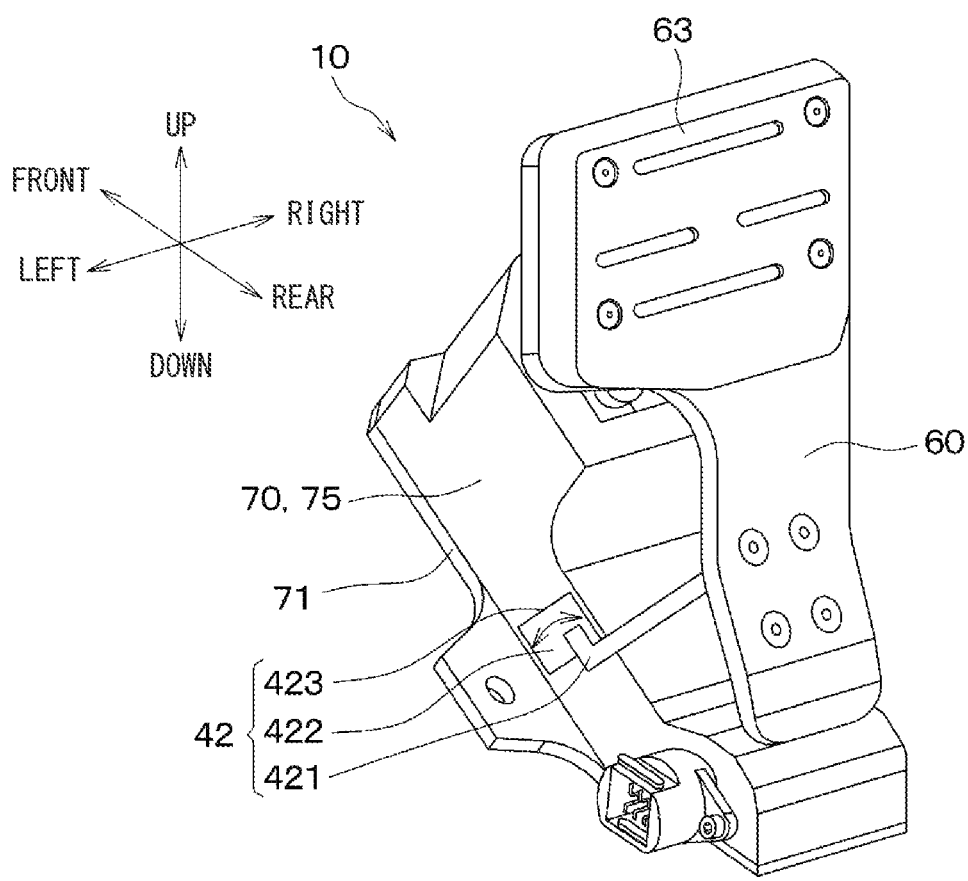
FIG. 3 is a perspective view of the brake pedal device seen from a left side, which is provided in the brake system according to the first embodiment.
Figure 4:
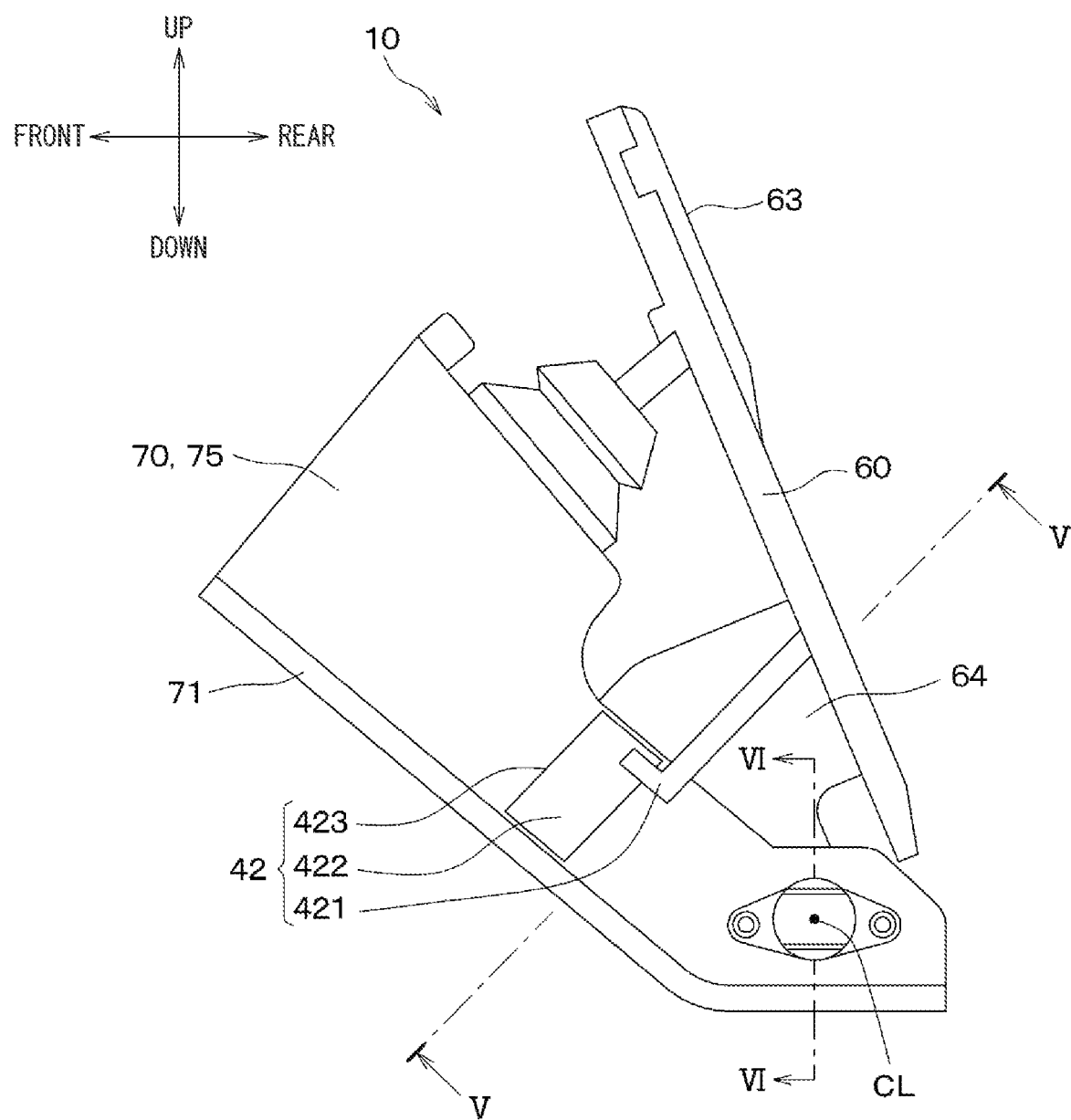
FIG. 4 is a left side view of the brake pedal device provided in the brake system according to the first embodiment.
Figure 6:
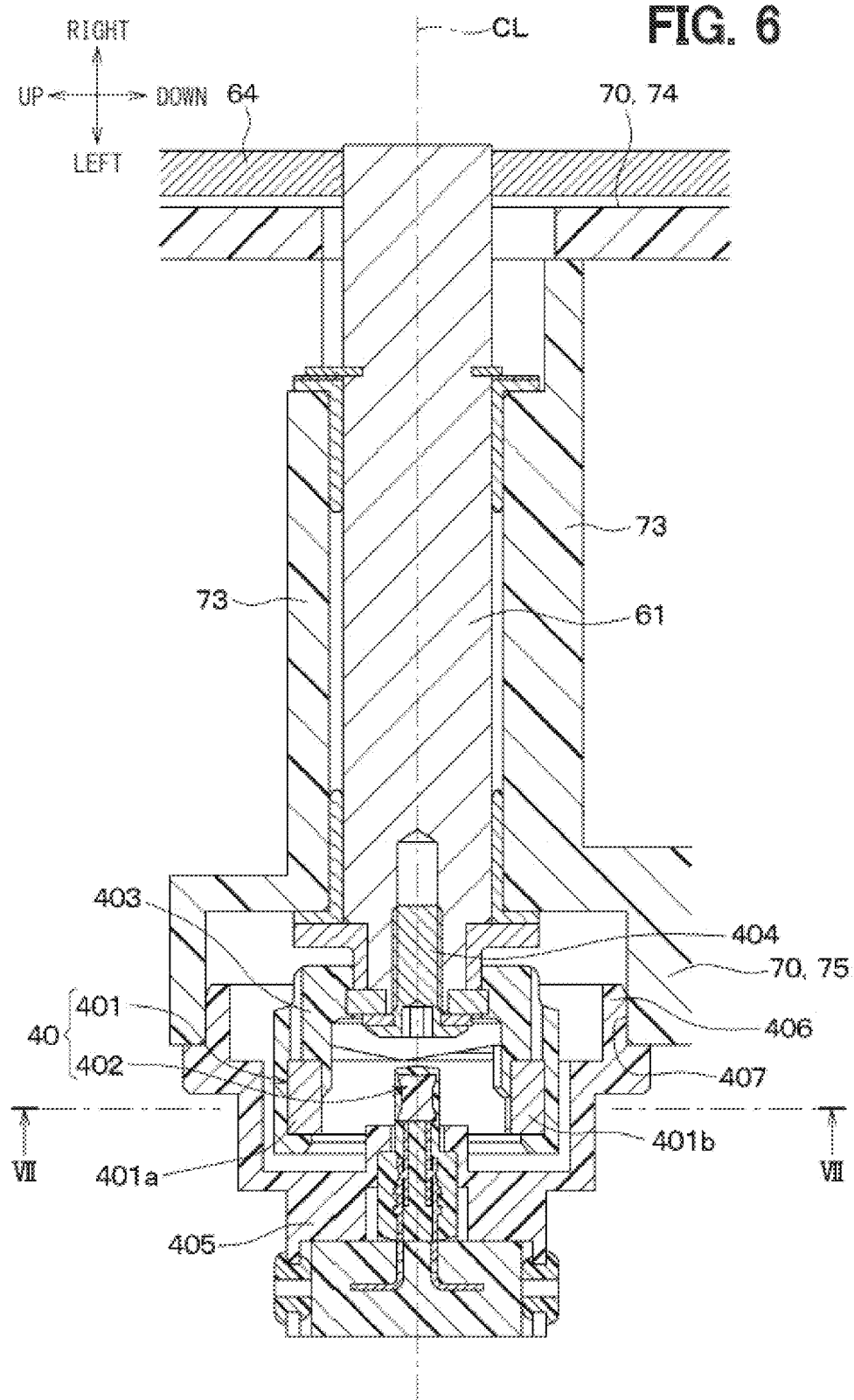
FIG. 6 is a cross-sectional view taken along a line VI-VI in FIG. 4.

As shown in FIGS. 2 to 4, the housing 70 is fixed to a floor or to a dash panel of the vehicle via a base plate 71 with bolts or the like. A shaft member 61 is provided in the housing 70. As shown in FIG. 6, the shaft member 61 is rotatably supported by bearings 73 provided inside the housing 70. One end of the shaft member 61 protrudes outward from a right side surface 74 of the housing 70.

As shown in FIGS. 2 to 4, the brake pedal 60 is formed in a plate shape and arranged obliquely with respect to the floor of the vehicle. Specifically, the brake pedal 60 is obliquely arranged so that an upper end thereof faces the front of the vehicle and a lower end thereof faces the rear of the vehicle. An upper portion of the brake pedal 60 is provided with a thick portion 63 as a portion to be stepped on by the driver.

The brake pedal 60 and the shaft member 61 are connected by a connecting portion 64. The connecting portion 64 is a plate-like member and is provided outside the right side surface 74 of the housing 70. A part of the connecting portion 64 is fixed to an end portion of the shaft member 61 protruding from the right side surface 74 of the housing 70, and a part of the connecting portion 64 on a brake pedal 60 side is fixed to a back surface of the brake pedal 60. With such a configuration, the brake pedal 60 is provided to be swingable with respect to the housing 70, having a center of the of the shaft member 61 as the axial center CL. In the present specification, the term "swing" refers to rotational movement in a forward direction and a backward direction within a predetermined angle range about a predetermined axial center CL.

Although not shown in the first embodiment, a space is provided inside the housing 70 for arranging a reaction force generating mechanism that generates a reaction force against a force applied to the brake pedal 60 by the driver. The reaction force generating mechanism provided in the space in the housing 70 can be configured with one or more elastic members, actuators, or the like. The brake pedal 60 of the present embodiment has a configuration in which the brake pedal 60 is not mechanically connected to a master cylinder that is provided in a conventional general brake circuit. Even in such a configuration, i.e., by having the reaction force generating mechanism, this brake pedal device 10 is capable of providing the same reaction force as the brake pedal device which has a mechanical connection between the brake pedal 60 and the master cylinder (that is, the reaction force due to a hydraulic pressure of the master cylinder is obtainable).

As shown in FIGS. 2 to 5, the two inductive sensors 41 and 42 detect a swing angle or a stroke amount of the brake pedal 60 with respect to the housing 70. Both the swing angle and the stroke amount of the brake pedal 60 are included in the pedal operation amount.

Figure 5:
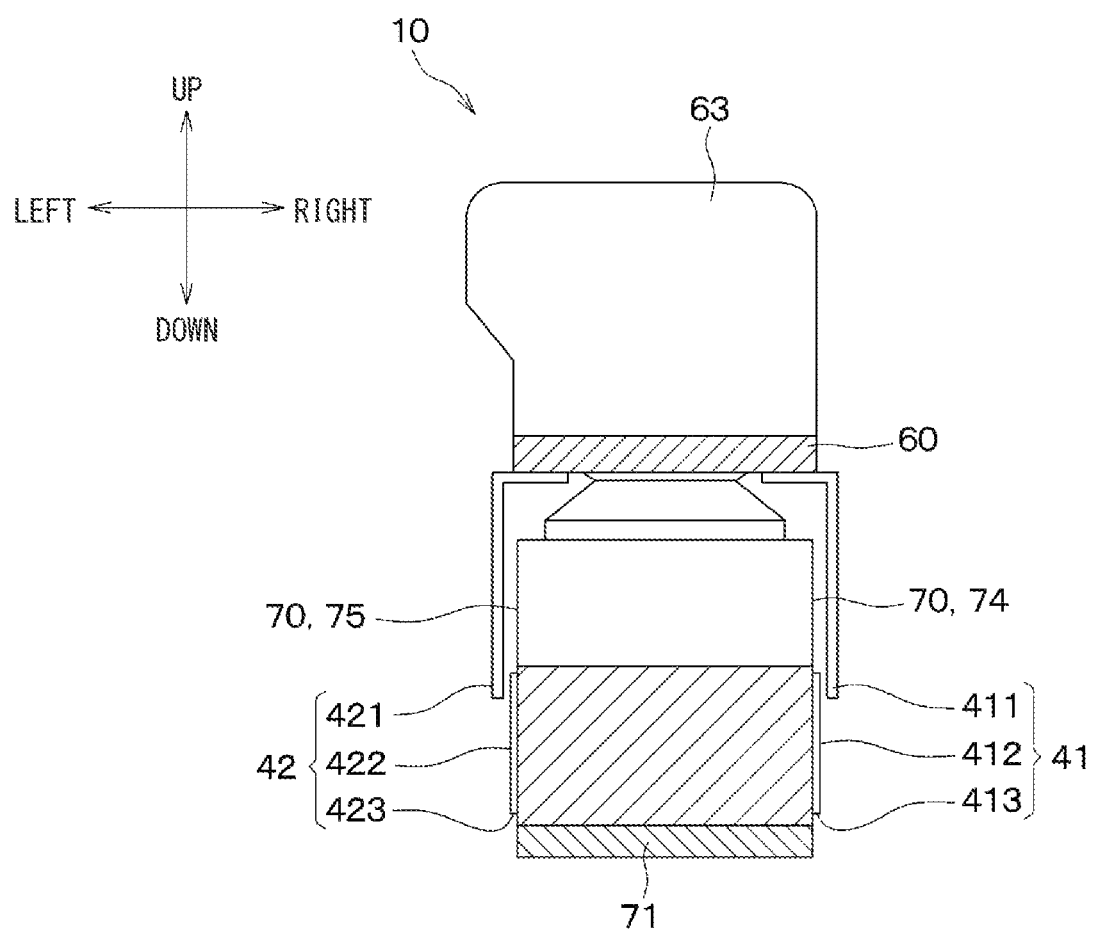
FIG. 5 is a cross-sectional view taken along a line V-V in FIG. 4.

As shown in FIGS. 2 and 5, the first inductive sensor 41 includes a first target metal 411 and a first circuit board 413. The first target metal 411 operates, i.e., moves, together with the brake pedal 60. A first sensing coil 412 for detecting the operation of the first target metal 411, a first reception and transmission circuit, and the like are implemented on the first circuit board 413. Note that the first sensing coil 412 includes a transmission coil and a reception coil. The first reception and transmission circuit applies an alternating current to the transmission coil of the first sensing coil 412, and detects the position of the first target metal 411 according to the change of the inductance of the reception coil, which is realized by using a physical principle of eddy currents generated in the first target metal 411 moving on the coil.

As shown in FIGS. 3 to 5, the second inductive sensor 42 includes a second target metal 421 and a second circuit board 423. The second target metal 421 operates, i.e., moves, together with the brake pedal 60. A second sensing coil 422 for detecting the operation of the second target metal 421, a second reception and transmission circuit, and the like are implemented on the second circuit board 423. Note that the second sensing coil 422 also includes a transmission coil and a reception coil. The second reception and transmission circuit apply an alternating current to the transmission coil of the second sensing coil 422, and detects the position of the second target metal 421 according to the change of the inductance of the reception coil, which is realized by using the physical principle of eddy currents generated in the second target metal 421 moving on the coil.

The first circuit board 413 on which the first sensing coil 412 and the like are implemented is provided on a first side surface of the housing 70 facing one side in the axial direction of the axial center CL. In contrast, the second circuit board 423 on which the second sensing coil 422 and the like are implemented is provided on a second side surface of the housing 70 facing the other axial direction of the axial center CL. In the first embodiment, the first side surface corresponds to the right side surface 74 and the second side surface corresponds to a left side surface 75. That is, the first sensing coil 412 is provided on the right side surface 74 and the second sensing coil 422 is provided on the left side surface 75. Note that the axial direction of the axial center CL can also be designated as a direction in which the axial center CL extends.

Further, an upper end portion of the first target metal 411 is fixed to a right portion of the brake pedal 60. The first target metal 411 extends from the right portion of the brake pedal 60 toward the floor of the vehicle. A lower end portion of the first target metal 411 is arranged at a position facing the first circuit board 413 on which the first sensing coil 412 and the like are provided. The first metal target 411 moves parallel to the right side surface 74 as the brake pedal 60 swings.

On the other hand, an upper end portion of the second target metal 421 is fixed to a left portion of the brake pedal 60. The second target metal 421 extends from the left portion of the brake pedal 60 toward the floor. A lower end portion of the second target metal 421 is arranged at a position facing the second circuit board 423 on which the second sensing coil 422 and the like are provided. The second target metal 421 moves parallel to the left side surface 75 as the brake pedal 60 swings.

Thus, in the first embodiment, the first sensing coil 412 of the first inductive sensor 41 is provided on the right side surface 74, and the second sensing coil 422 of the second inductive sensor 42 is provided on the left side surface 75. That is, the first sensing coil 412 and the second sensing coil 422 are provided on the left and right sides of the housing 70. In such manner, the two inductive sensors 41 and 42 do not detect the move of the target metal of any other inductive sensors other than the target metal of the own inductive sensor. Further, even if a conductive foreign object approaches the first sensing coil 412 provided on the right side surface 74 of the housing 70 and the output signal of the first inductive sensor 41 becomes abnormal, the output signals of the second inductive sensor 42 are not affected by the conductive foreign object. Similarly, even if a conductive foreign object approaches the second sensing coil 422 provided on the left side surface 75 of the housing 70 and the output signal of the second inductive sensor 42 becomes abnormal, the output signals of the first inductive sensor 41 are not affected by the conductive foreign object.

Figure 7:
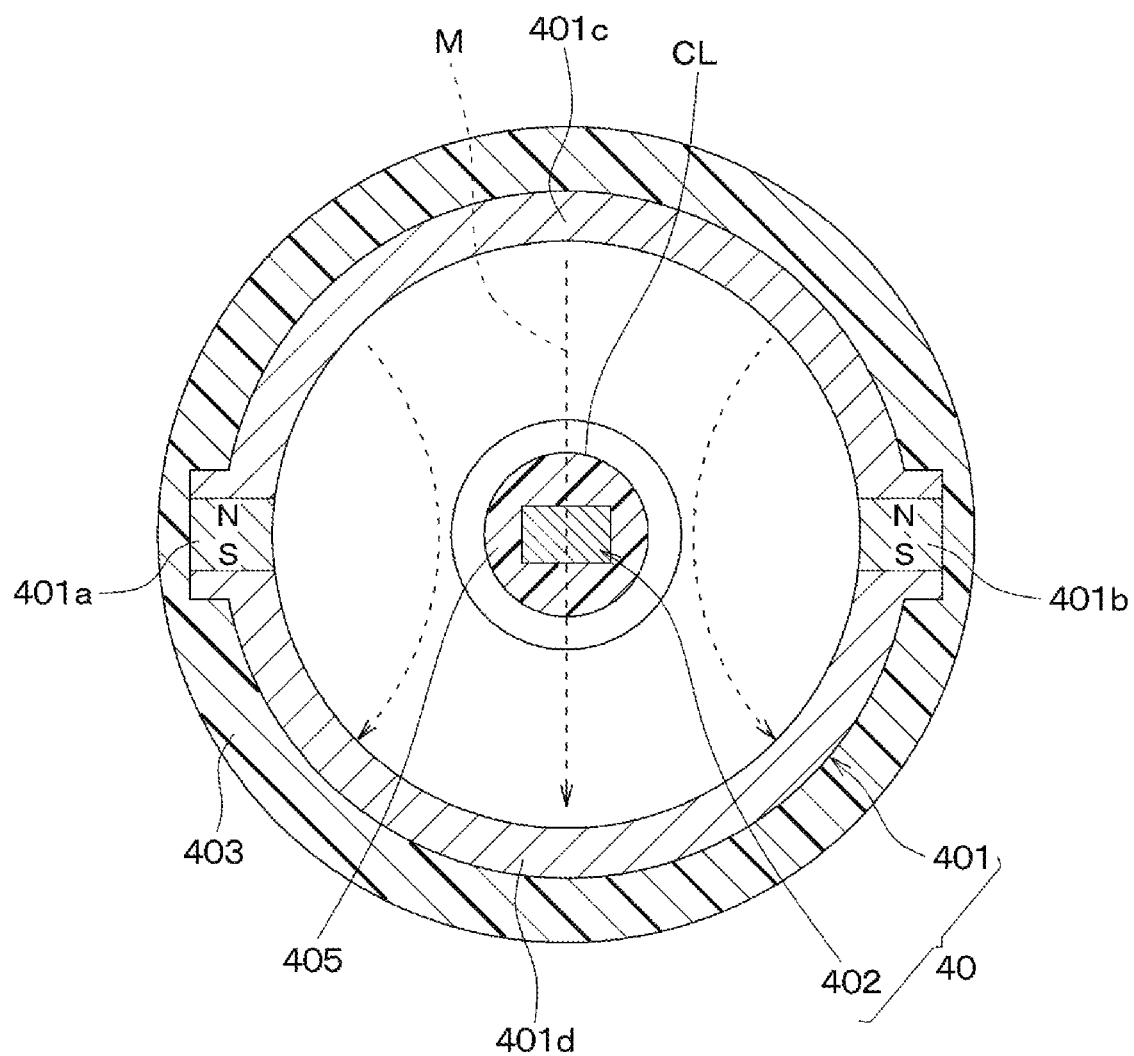
FIG. 7 is a cross-sectional view taken along a line VII-VII in FIG. 6.

Next, as shown in FIGS. 6 and 7, one magnetic sensor 40 includes a magnetic circuit unit 401 (i.e., magnetic circuit) fixed to the end portion of the shaft member 61 that operates together with the brake pedal 60, and a magnetic detection unit 402 (i.e., magnetic detector) that detects a change in the magnetic field generated by the magnetic circuit unit 401. The magnetic sensor 40 also detects the swing angle of the brake pedal 60 with respect to the housing 70. As described above, the swing angle of the brake pedal 60 is included in the pedal operation amount.

Specifically, the magnetic circuit unit 401 is formed in a cylindrical shape by two permanent magnets 401a and 401b and two arcuate yokes 401c and 401d, and is provided around the axial center CL of the shaft member 61. The magnetic circuit unit 401 forms a closed magnetic circuit. Note that the closed magnetic circuit is a circuit in which the permanent magnets 401a and 401b and the yokes 401c and 401d are in contact with each other and a loop through which the magnetic flux flows is closed.

The two permanent magnets 401a and 401b are arranged on one side and the other side in the radial direction with the axial center CL interposed therebetween. In the following description, of the two permanent magnets 401a and 401b, the magnet arranged on one side in the radial direction across the axial center CL is called as a first magnet 401a, and the magnet arranged on the other side in the radial direction is called as a second magnet 401b. Further, one of the two yokes 401c and 401d is called as a first yoke 401c, and the other yoke is called as a second yoke 401d.

The first yoke 401c has one circumferential end connected to the N pole of the first magnet 401a and the other circumferential end connected to the N pole of the second magnet 401b. The second yoke 401d has one circumferential end connected to the S pole of the first magnet 401a and the other circumferential end connected to the S pole of the second magnet 401b. Therefore, as indicated by a dashed arrow M in FIG. 7, a magnetic field is formed in a radially inner region of the magnetic circuit unit 401, where the magnetic flux flies in a direction intersecting the axial center CL from the first yoke 401c toward the second yoke 401d.

The magnetic circuit unit 401 is insert-molded inside a resin portion 403. The resin portion 403 is fixed to one end of the shaft member 61 with a bolt 404 or the like. In such state, the center of the magnetic circuit unit 401 and the axial center CL of the shaft member 61 are aligned. Further, the magnetic circuit unit 401 swings together with the shaft member 61 about the axial center CL of the shaft member 61. When the magnetic circuit unit 401 swings about the axial center CL together with the shaft member 61, the direction of the magnetic field formed in the radially inner region of the magnetic circuit unit 401 changes. The magnetic detection unit 402 is provided in the radially inner region of the magnetic circuit unit 401.

The magnetic detection unit 402 is integrally provided by insert molding as one body in the resin forming a sensor holder unit 405. The sensor holder unit 405 is fixed to the housing 70. Note that positioning between the sensor holder unit 405 and the housing 70 is performed by fitting a protrusion 406 provided on an outer peripheral edge of the sensor holder unit 405 to an inner wall surface 407 of an opening provided in the housing 70. In such state, it is possible to prevent positional deviation between the magnetic detection unit 402 provided on the sensor holder unit 405 and the axial center CL of the shaft member 61.

The magnetic detection unit 402 is composed of a magnetoresistive element (hereinafter referred to as "MR element") or a Hall element that outputs a signal corresponding to the magnetic field of the magnetic circuit unit 401. MR is an abbreviation for Magneto Resistive. The MR element is an element whose electric resistance value changes according to the angle of the magnetic field in the horizontal direction with respect to a magnetic sensitive surface. The Hall element is an element that outputs a Hall voltage corresponding to the intensity of a magnetic field perpendicular to a magnetic sensitive surface.

When the driver depresses the brake pedal 60, the brake pedal 60, the shaft member 61, and the magnetic circuit unit 401 all swing about the axial center CL. The magnetic detection unit 402 outputs a signal corresponding to the swing angle of the magnetic circuit unit 401. The swing angle of the magnetic circuit unit 401 is the same as the swing angle of the brake pedal 60. Therefore, the magnetic sensor 40 outputs a signal corresponding to the swing angle of the brake pedal 60 with respect to the housing 70 as the operation amount of the brake pedal 60.

The output signals of the two inductive sensors 41 and 42 provided in the brake pedal device 10 and the output signal of the one magnetic sensor 40 are input to the ECU 20, respectively. The ECU 20 detects an accurate pedal operation amount based on the output signals from the three sensors described above. As for the method of detecting the pedal operation amount performed by the ECU 20, a plurality of methods described below are conceivable.

First, an example of a method for detecting the pedal operation amount will be described with reference to FIG. 8.

Figure 8:
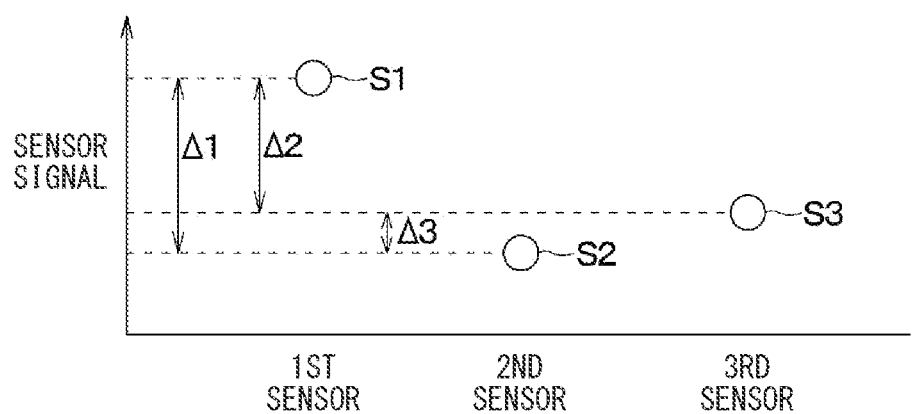
FIG. 8 is an explanatory diagram for explaining an example of a method of detecting a pedal operation amount.

The horizontal axis in FIG. 8 represents the three sensors as a first sensor, a second sensor, and a third sensor, respectively. Note that the correspondence between the two inductive sensors 41 and 42 and one magnetic sensor 40 and the first to third sensors is not particularly limited, and any correspondence may be made. The vertical axis in FIG. 8 indicates the magnitude of a signal that is input from each sensor to the ECU 20 and converted into a value that can be compared with each other in accordance with the output characteristics of each sensor inside the ECU 20, which is referred to as a sensor signal. In the following description, signals obtained by converting the output signals of the first to third sensors into mutually comparable values are referred to as a first sensor signal S1, a second sensor signal S2, and a third sensor signal S3, respectively. FIG. 8 shows an example of the first to third sensor signals S1 to S3 when the brake pedal 60 is at a predetermined swing angle. This also applies to FIGS. 9 and 10A to 10C to which reference will be made in later explanation.

In one example of the pedal operation amount detection method, the ECU 20 calculates a difference value for all combinations of two sensor signals selected from the first to third sensor signals S1 to S3. Note that the difference value is calculated as an absolute value. Then, the ECU 20 determines the two sensor signals which have yielded the smallest difference value among the plurality of calculated difference values are normal values, and detects the pedal operation amount based on such normal values.

Specifically, as shown in FIG. 8, the ECU 20 calculates a difference value Δ1 between the first sensor signal S1 and the second sensor signal S2. Further, the ECU 20 calculates a difference value Δ2 between the first sensor signal S1 and the third sensor signal S3. The ECU 20 calculates a difference value Δ3 between the second sensor signal S2 and the third sensor signal S3. In the example in FIG. 8, Δ3 is the smallest among the three difference values Δ1, Δ2, and Δ3. In such case, the ECU 20 determines that the second sensor signal S2 and the third sensor signal S3 which have yielded the difference value Δ3 have been calculated as a normal value, and detects the pedal operation amount based on the second sensor signal S2 and the third sensor signal S3.

Next, another example of the method of detecting the pedal operation amount will be described with reference to FIG. 9.

In another example of the pedal operation amount detection method, the ECU 20 detects an intermediate value of the first to third sensor signals S1 to S3, as a normal sensor signal, excluding the sensor signal indicating the maximum value and the sensor signal indicating the minimum value. Then, the ECU 20 detects the pedal operation amount based on the normal sensor signal.

Figure 9:
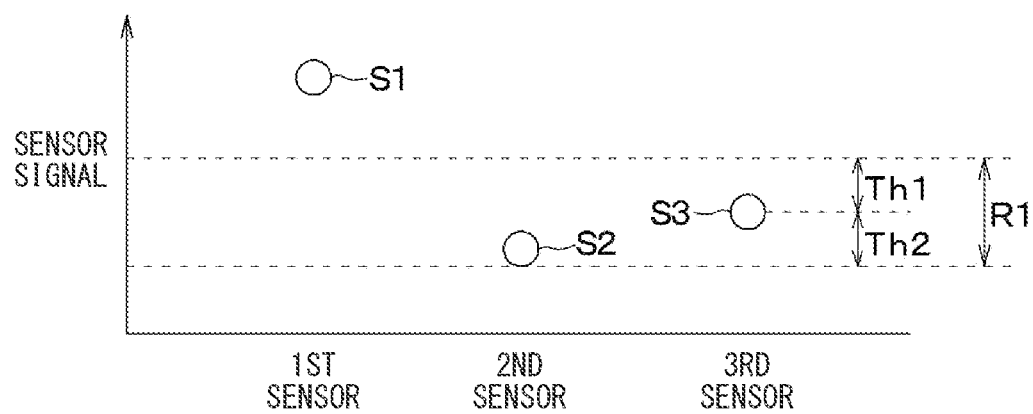
FIG. 9 is an explanatory diagram for explaining an another example of a method of detecting a pedal operation amount.

Specifically, as shown in the example in FIG. 9, the ECU 20 determines the third sensor signal S3 as a normal sensor signal, excluding, from among the first to third sensor signals S1 to S3, the first sensor signal S1 indicating the maximum value and the second sensor signal S2 indicating the minimum value. Then, the ECU 20 detects the pedal operation amount based on the normal third sensor signal S3.

There is also the following detection method as a modification of the another example of the detection method. For example, the ECU 20 may determine a sensor signal that falls within a reference range, which is defined by adding and subtracting a predetermined value to/from an intermediate value of the first to third sensor signals S1 to S3, i.e., an upper limit value and a lower limit value of the reference range obtained by adding and subtracting a predetermined value. That is, as shown in the example in FIG. 9, the ECU 20 sets the upper limit value obtained by adding a predetermined value Th1 to the normal third sensor signal S3 indicating an intermediate value among the first to third sensor signals S1 to S3, and sets the lower limit value obtained by subtracting a predetermined value Th2. In the example in FIG. 9, a reference range R1 contains the second sensor signal S2. In such case, the ECU 20 determines that the second sensor signal S2, which falls within the reference range R1 of the third sensor signal S3, is normal in addition to the third sensor signal S3 indicating an intermediate value, and the pedal operation amount is detected based on the sensor signal S2 and the third sensor signal S3.

Next, still another example of the method of detecting the pedal operation amount will be described with reference to FIGS. 10A to 10C.

In yet another example of the pedal operation amount detection method, the ECU 20 sets the reference range between an upper limit value and a lower limit value, the upper limit value and the lower limit value obtained by adding and subtracting a predetermined value to and from a predetermined sensor signal among the first to third sensor signals S1 to S3. Then, the ECU 20 determines whether or not two other sensor signals other than the predetermined sensor signal fall within the reference range that is set based on the predetermined sensor signal by the majority decision, thereby discriminating each of the three sensor signals as indicating an abnormal value or a normal value. In this detection method, the predetermined sensor signal can be arbitrarily set from among the first to third sensor signals S1 to S3. Further, the value to be added to and the value to be subtracted from the predetermined sensor signal may be a constant value, or may be switched according to a travel speed of the vehicle or the like.

Figure 10A:
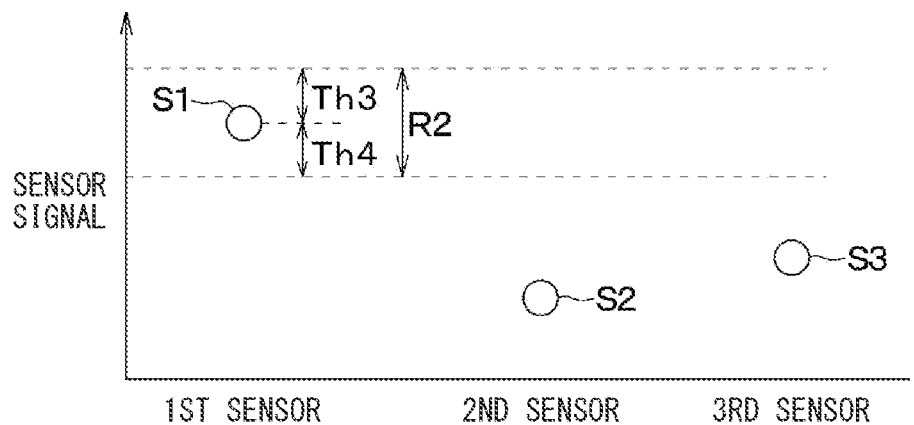
FIG. 10A is an explanatory diagram for explaining a further another example of a method of detecting a pedal operation amount.
Figure 10B:
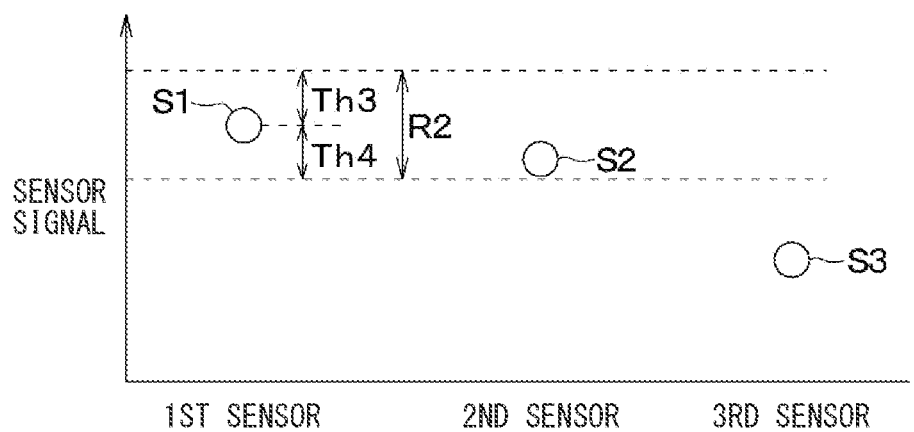
FIG. 10B is an explanatory diagram for explaining a further another example of a method of detecting a pedal operation amount.
Figure 10C:
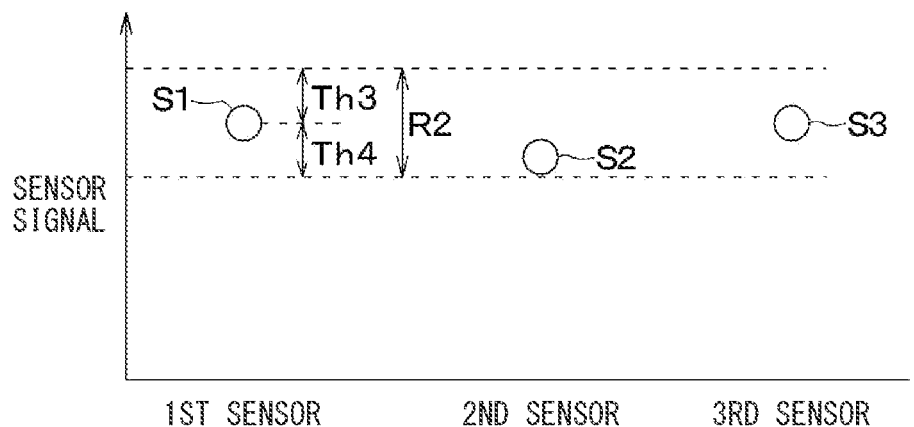
FIG. 10C is an explanatory diagram for explaining a further another example of a method of detecting a pedal operation amount.

Specifically, in the examples shown in FIGS. 10A to 10C, a predetermined sensor signal that can be arbitrarily set from among the first to third sensor signals S1 to S3 is the first sensor signal S1. The ECU 20 sets a reference range R2 between an upper limit value obtained by adding a predetermined value Th3 to the first sensor signal S1 and a lower limit value obtained by subtracting a predetermined value Th4 from the first sensor signal S1. Then, a majority decision is taken as to whether the second sensor signal S2 and the third sensor signal S3 fall within the reference range R2, and a normal sensor signal and an abnormal signal are discriminated.

In the example shown in FIG. 10A, neither the second sensor signal S2 nor the third sensor signal S3 is included in the reference range R2 of the first sensor signal S1. In such case, the ECU 20 determines by the majority decision that the first sensor signal S1 is an abnormal signal and the second sensor signal S2 and the third sensor signal S3 are normal signals. Then, the ECU 20 detects the pedal operation amount based on the second sensor signal S2 and third sensor signal S3 respectively determined as normal.

In the example shown in FIG. 10B, the reference range R2 of the first sensor signal S1 includes the second sensor signal S2 and does not include the third sensor signal S3. In such case, the ECU 20 determines by the majority decision that the first sensor signal S1 and the second sensor signal S2 are normal signals and the third sensor signal S3 is an abnormal signal. Then, the ECU 20 detects the pedal operation amount based on the first sensor signal S1 and second sensor signal S2 respectively determined as normal.

In the example shown in FIG. 10C, both the second sensor signal S2 and the third sensor signal S3 are included in the reference range R2 of the first sensor signal S1. In such case, the ECU 20 determines that all of the first to third sensor signals S1 to S3 are normal signals. Then, the ECU 20 detects the pedal operation amount based on the first to third sensor signals S1 to S3 respectively determined as normal.

The brake pedal device 10 and the brake system 1 of the first embodiment described above have the following effects.

(1) The brake pedal device 10 of the first embodiment includes three sensors that output signals corresponding to the operation amount of the brake pedal 60. The three sensors include one magnetic sensor 40 and two inductive sensors 41,42.

The two inductive sensors 41 and 42 are arranged apart from each other such that move of the target metal of any other inductive sensors other than move of the target metal of own inductive sensor is not detected by the sensing coil of the own inductive sensor.

According to the above, the brake pedal device 10 is configured to detect the operation amount of the brake pedal 60 by a plurality of non-contact sensors having different detection principles, such as the magnetic sensor 40 and the inductive sensor. Therefore, even if the output signal of one sensor becomes abnormal due to a disturber such as a magnetic foreign object or a conductive foreign object brought close to the sensor, regarding which each sensor is not good at handling, the output signals of the other sensor or sensors can be maintained normal. Therefore, the brake pedal device 10 can accurately detect the pedal operation amount by (i) ensuring the redundancy of the output signals of the sensors and (ii) taking a majority decision among the output signals of the three sensors in the electronic control unit 20.

Further, the two inductive sensors 41 and 42 are arranged apart from each other such that move of the target metal of any other inductive sensors other than move of the target metal of own inductive sensor is not detected by the sensing coil of the own inductive sensor. Therefore, even if a conductive foreign object intrudes into a space between the sensing coil of one inductive sensor and the target metal, the output signals of the other inductive sensors can be maintained normal. Therefore, the brake pedal device 10 can prevent the simultaneous failure of a plurality of inductive sensors, thereby ensuring redundancy of the output signals and accurately detecting the pedal operation amount in the ECU 20.

Further, the brake pedal device 10 has one magnetic sensor 40 and the two inductive sensors 41 and 42. Therefore, even if the magnetic sensor 40 fails due to the magnetic foreign object brought close, the output signals of the two inductive sensors 41 and 42 can be maintained normal. Therefore, the brake pedal device 10 can ensure the redundancy of the output signal of the sensor, and the ECU 20 can accurately detect the pedal operation amount.

(2) In the brake pedal device 10 of the first embodiment, the sensing coil 412 of the first inductive sensor 41 is provided on the first side surface of the housing 70, and the sensing coil 422 of the second inductive sensor 42 is provided on the second side of the housing 70. In the present embodiment, the first side surface corresponds to the right side surface 74 and the second side surface corresponds to the left side surface 75. According to the above, by arranging the two sensing coils 412 and 422 of the two inductive sensors 41 and 42 on the first side and the second side of the housing 70 respectively, adjacency of the inductive sensors 41 and 42 is preventable. Therefore, it is possible to prevent simultaneous failure of the plurality of inductive sensors 41 and 42 due to conductive foreign object.

(3) The brake system 1 of the first embodiment has the following detection method as an example of the detection method of the pedal operation amount performed by the ECU 20. That is, difference values are calculated for all combinations of two sensor signals selected from the first to third sensor signals S1 to S3. Then, the ECU 20 determines the two sensor signals which have yielded the smallest difference value among the plurality of calculated difference values are normal values. According to the above, even if one sensor signal out of the first to third sensor signals S1 to S3 takes an abnormal value, the operation amount of the brake pedal 60 is detectable by the normal sensor signal(s) without adopting the above-described sensor signal indicating the abnormal value.

(4) The brake system 1 of the first embodiment has the following detection method as another example of the detection method of the pedal operation amount performed by the ECU 20. That is, among the first to third sensor signals S1 to S3, a sensor signal indicating an intermediate value excluding (a) the sensor signal indicating the maximum value and (b) the sensor signal indicating the minimum value is determined as a normal sensor signal. According to the above, even if one of the three sensor signals takes an abnormal value, the ECU 20 can detect the operation amount of the brake pedal 60 without adopting the sensor signal indicating the abnormal value.

(5) The brake system 1 of the first embodiment has the following detection method as yet another example of the detection method of the pedal operation amount performed by the ECU 20. That is, the reference range R2 is set between (a) the upper limit value obtained by adding the predetermined value Th3 to the predetermined sensor signal and (b) the lower limit value obtained by subtracting the predetermined value Th4. Then, the ECU 20 determines by the majority decision whether or not two sensor signals other than the predetermined sensor signal fall within the reference range R2 set for the predetermined sensor signal, and discriminates a sensor signal indicating an abnormal value and a normal sensor signal. According to the above, the reference range R2 is provided for a predetermined sensor signal among the output signals of the three sensors, and by taking a majority decision as to whether or not the other two sensor signals fall within the reference range R2, a sensor signal indicating an abnormal value and a normal sensor signal are discriminated.

Second Embodiment

The following describes the second embodiment of the present disclosure. The second embodiment has a different configuration of the structure of three sensors, which is changed from the configuration of a brake pedal device 10 in the first embodiment. Since the other part of the second embodiment is the same as the first embodiment, only different part will be explained.

Figure 11:
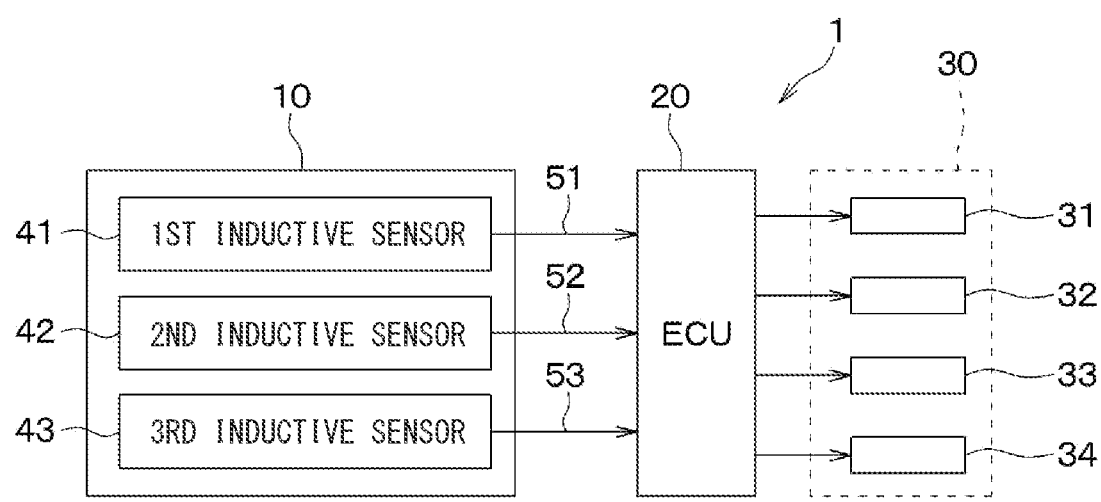
FIG. 11 is a block diagram of a schematic configuration of a brake system according to a second embodiment.

As shown in FIG. 11, the brake pedal device 10 of the second embodiment includes three inductive sensors 41 to 43 as a plurality of sensors that output signals corresponding to the pedal operation amount. In the description provided in the following, the three inductive sensors included in the brake pedal device 10 of the second embodiment are referred to as a first inductive sensor 41, a second inductive sensor 42, and a third inductive sensor 43, respectively. In the second embodiment, the output signals of the first to third inductive sensors 41 to 43 are input to the ECU 20, respectively. The ECU 20 detects an accurate pedal operation amount based on the output signals of the first to third inductive sensors 41 to 43 and drive-controls the brake circuit 30.

The configuration of the first inductive sensor 41 and the second inductive sensor 42 in the second embodiment is the same as the configuration of the first inductive sensor 41 and the second inductive sensor 42 described with reference to FIGS. 2 to 5 in the first embodiment. That is, as shown in FIGS. 2 and 5, the first circuit board 413 on which the first sensing coil 412 and the like of the first inductive sensor 41 are implemented is provided on the right side surface 74 of the housing 70. On the other hand, as shown in FIGS. 3 to 5, the second circuit board 423 on which the second sensing coil 422 and the like of the second inductive sensor 42 are implemented is provided on the left side surface 75 of the housing.

Figure 12:
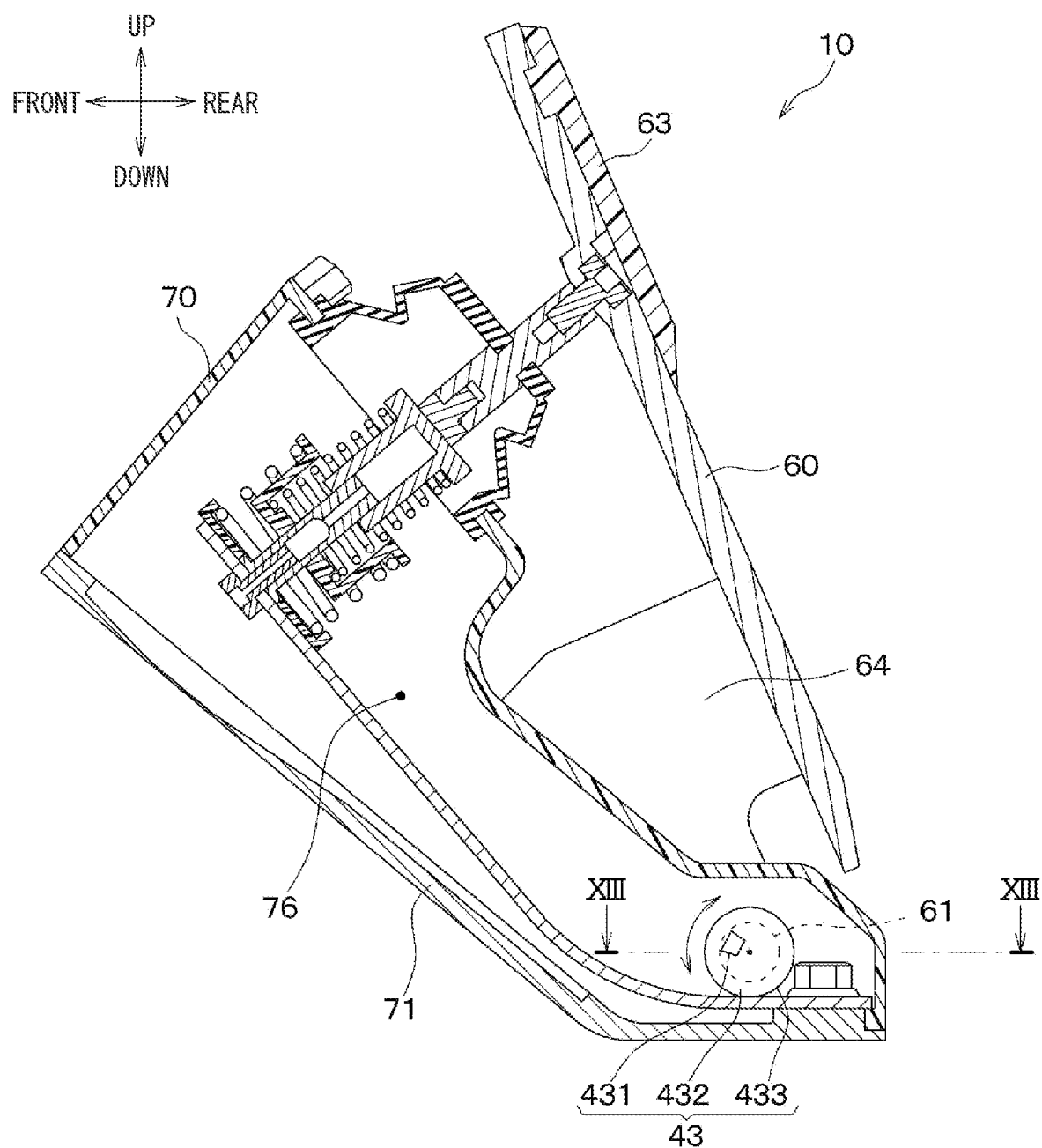
FIG. 12 is a cross-sectional view of a brake pedal device provided in a brake system according to the second embodiment.
Figure 13:
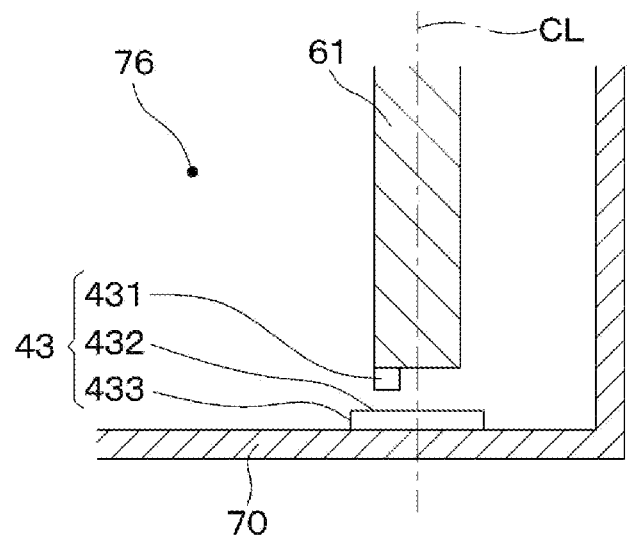
FIG. 13 is a cross-sectional view taken along a line XIII-XIII in FIG. 12.

Further, as shown in FIGS. 12 and 13, the third inductive sensor 43 included in the brake pedal device 10 of the second embodiment is provided inside the housing 70. The inside of the housing 70 forms a sealed space 76 that prevents foreign objects from entering from the outside. The third inductive sensor 43 has a third target metal 431 that operates together with the shaft member 61, and a third circuit board 433 on which a third sensing coil 432 and a third reception and transmission circuit are implemented. The third target metal 431 is fixed to the end portion of the shaft member 61, and moves together with the shaft member 61. On the other hand, the third circuit board 433 is provided on an inner wall of the housing 70 at a position facing the third target metal 431 in the axial direction of the axial center CL. The third reception and transmission circuit apply an alternating current to the transmission coil of the third sensing coil 432, and, by using the physical principle of eddy currents generated in the third target metal 431 moving on the coil, detects the position of the third target metal 431 from the change of the inductance of the reception coil. Since the third inductive sensor 43 is arranged in the sealed space 76 inside the housing 70 into which conductive foreign objects do not enter, erroneous detection due to conductive foreign objects is prevented.

In the second embodiment described above, the three inductive sensors 41 to 43 do not detect the move of the target metal of any other inductive sensors other than the target metals of the own inductive sensor. Further, the first circuit board 413 of the first inductive sensor 41 is provided on the right side 74 of the housing 70, and the second circuit board 423 of the second inductive sensor 42 is provided on the left side 75 of the housing 70. The third inductive sensor 43 is further provided inside the housing 70. By arranging the three inductive sensors 41 to 43 at a distance from each other in the above-described manner, it is possible to prevent simultaneous failure of the sensors due to conductive foreign objects. Therefore, the brake pedal device 10 can prevent the simultaneous failure of a plurality of inductive sensors, thereby ensuring redundancy of the output signals and accurately detecting the pedal operation amount in the ECU 20.

Third Embodiment

The following describes the third embodiment of the present disclosure. The third embodiment is a modification of the first and second embodiments, and changes the installation method of the inductive sensor with respect to a brake pedal device 10.

Figure 14:
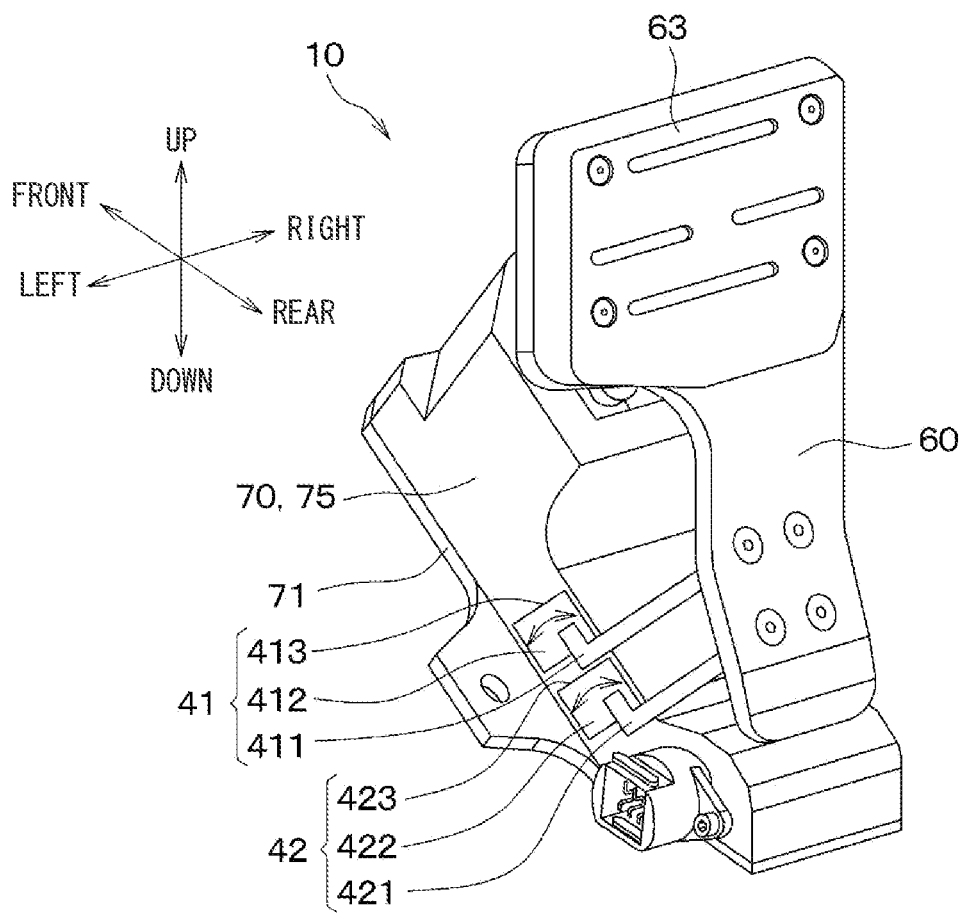
FIG. 14 is a perspective view of a brake pedal device seen from a left side according to a third embodiment.

As shown in FIG. 14, the brake pedal device 10 of the third embodiment has two inductive sensors 41 and 42 on the left side of the housing 70. The two circuit boards 413 and 423 on which the sensing coils 412 and 422 of the two inductive sensors 41 and 42 are implemented are arranged side by side in a vehicle front-rear direction on the left side surface 75 of the housing 70. On the other hand, the two target metals 411 and 421 of the two inductive sensors 41 and 42 are arranged side by side in the vehicle front-rear direction on the left side of the brake pedal 60. The two target metals 411 and 421 of the two inductive sensors 41 and 42 extend from the left portion of the brake pedal 60 toward the floor of the vehicle. The lower end portions of the two target metals 411 and 421 are arranged at positions facing the circuit boards 413 and 423 on which the corresponding sensing coils 412 and 422 and the reception and transmission circuits are provided, respectively. The two target metals 411 and 421 move parallel to the left side surface 75 as the brake pedal 60 swings.

The brake pedal device 10 of the third embodiment includes the third inductive sensor 43 in addition to the two inductive sensors 41 and 42 described above. For example, the third inductive sensor 43 may be arranged on a right side surface 74 side of the housing 70 as shown in FIG. 2. Alternatively, the third inductive sensor 43 may be arranged inside the housing 70, as shown in FIGS. 12 and 13, for example. Alternatively, the third inductive sensor 43 may be arranged side by side in the vehicle front-rear direction on the left side surface 75 of the housing 70 together with the two inductive sensors 41 and 42 shown in FIG. 14, for example.

In the third embodiment described above as well, by arranging the three inductive sensors 41 to 43 apart from each other, it is possible to prevent simultaneous failure of the sensors due to conductive foreign objects. Therefore, the brake pedal device 10 can prevent the simultaneous failure of the plurality of inductive sensors, thereby ensuring redundancy of the output signals and accurately detecting the pedal operation amount in the ECU 20.

In addition, in the configuration of the third embodiment, the magnetic sensor 40 may be installed instead of the third inductive sensor 43.

Fourth Embodiment

The following describes the fourth embodiment of the present disclosure. The fourth embodiment is also a modification of the first to third embodiments, in which the installation method of the inductive sensor with respect to a brake pedal device 10 is changed.

Figure 15:
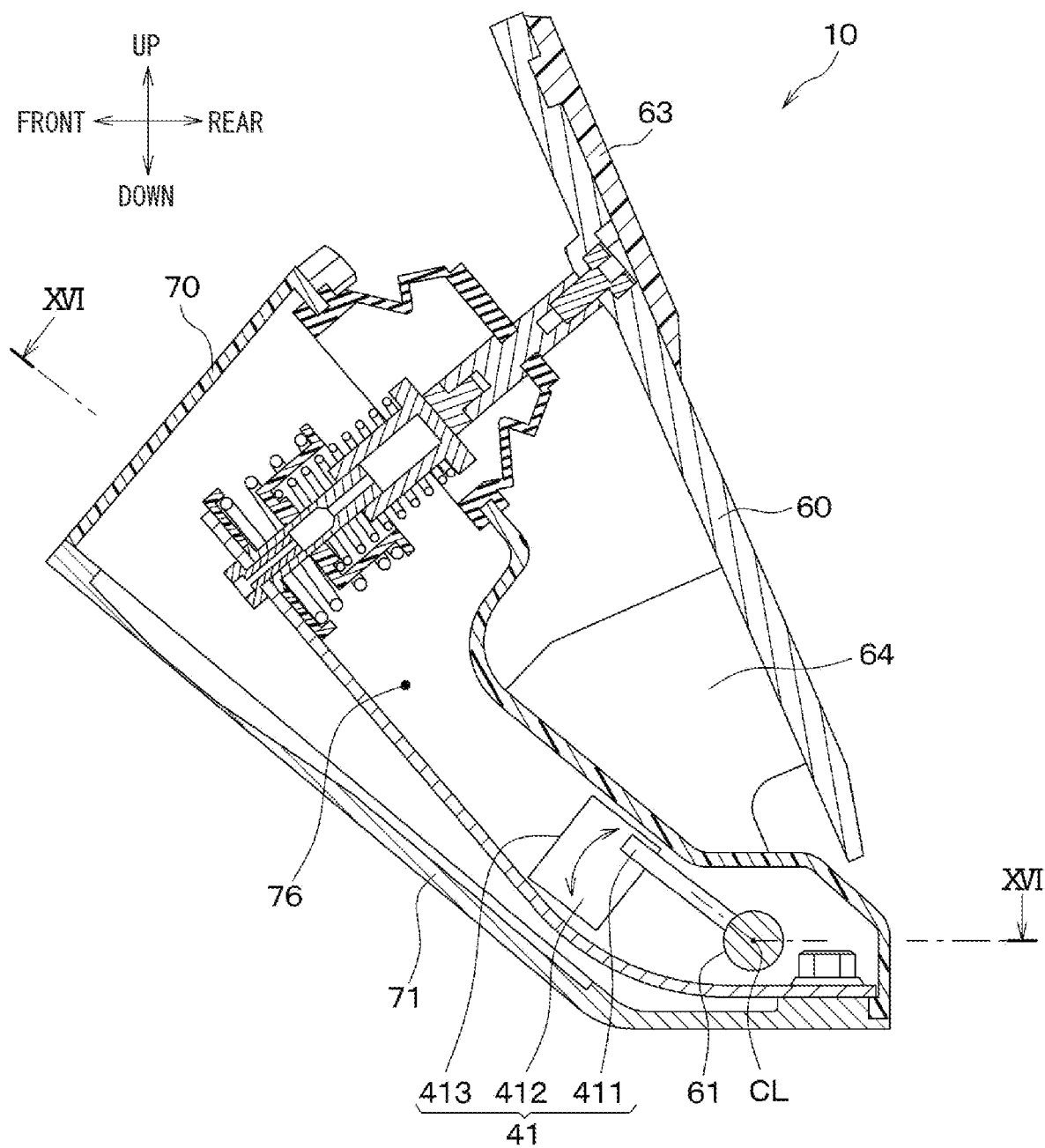
FIG. 15 is a cross-sectional view of a brake pedal device according to a fourth embodiment.
Figure 16:
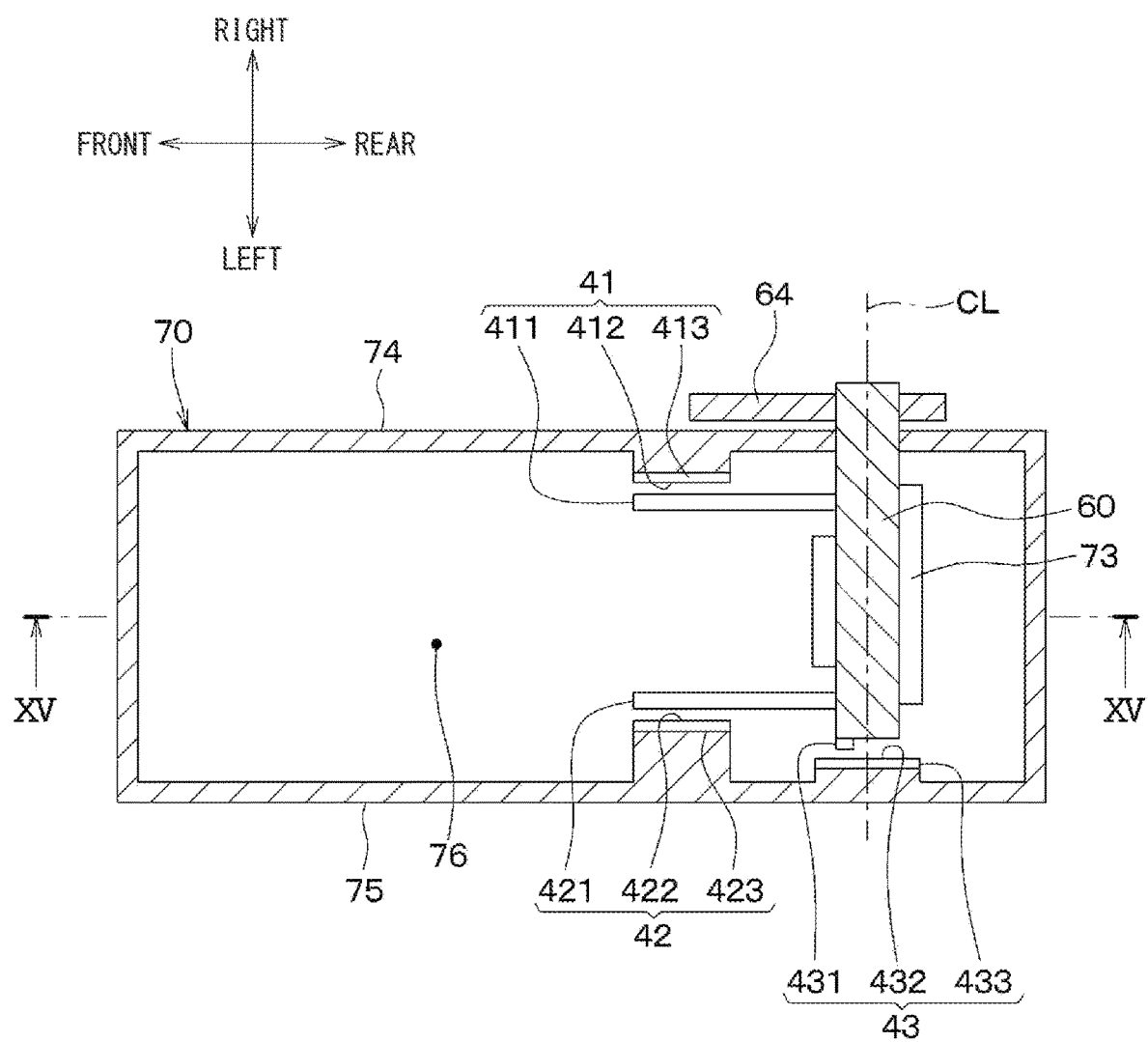
FIG. 16 is a cross-sectional view taken along a line XVI-XVI in FIG. 15.

As shown in FIGS. 15 and 16, the brake pedal device 10 of the fourth embodiment also includes the three inductive sensors 41 to 43 as multiple sensors for outputting signals according to the pedal operation amount. In the following description, the three inductive sensors included in the brake pedal device 10 of the fourth embodiment are also referred to as a first inductive sensor 41, a second inductive sensor 42, and a third inductive sensor 43, respectively. The first to third inductive sensors 41 to 43 are provided inside the housing 70. The inside of the housing 70 forms a sealed space 76 that prevents foreign objects from entering from the outside.

The first inductive sensor 41 includes a first circuit board 413 on which a first sensing coil 412, a first reception and transmission circuit and the like are implemented, and a first target metal 411 facing the first circuit board 413. The first circuit board 413 on which the first sensing coil 412, the first reception and transmission circuit and the like are implemented is provided on an inner wall of the right side surface 74 of the housing 70. The first target metal 411 is provided to extend toward the front of the vehicle from the shaft member 61. The end portion of the first target metal 411 opposite to the shaft member 61 is arranged at a position facing the first circuit board 413 in the axial direction of the axial center CL. The first target metal 411 moves parallel to the first circuit board 413 as the brake pedal 60 and the shaft member 61 swing.

The second inductive sensor 42 includes a second circuit board 423 on which a second sensing coil 422, a second reception and transmission circuit and the like are implemented, and a second target metal 421 facing the second circuit board 423. The second circuit board 423 on which the second sensing coil 422, the second reception and transmission circuit and the like are implemented is provided on an inner wall of the left side surface 75 of the housing 70. The second target metal 421 is provided to extend toward the front of the vehicle from the shaft member 61. The end portion of the second target metal 421 opposite to the shaft member 61 is arranged at a position facing the second circuit board 423 in the axial direction of the axial center CL. The second target metal 421 moves parallel to the second circuit board 423 as the brake pedal 60 and the shaft member 61 swing.

The third inductive sensor 43 includes a third circuit board 433 on which a third sensing coil 432, a third reception and transmission circuit and the like are implemented, and a third target metal 431 facing the third circuit board 433. The third target metal 431 is fixed to the end portion of the shaft member 61 and moves together with the shaft member 61. The third circuit board 433 is provided on an inner wall of the housing 70 at a position facing the third target metal 431 in the axial direction of the axial center CL.

In the fourth embodiment described above, since all of the first to third inductive sensors 41 to 43 are arranged in the sealed space 76 inside the housing 70 where no conductive foreign object enters, erroneous detection due to conductive foreign object never occurs. Also, the first to third inductive sensors 41 to 43 are arranged apart inside the housing 70 at a distance from each other. Therefore, even if a conductive foreign object enters the housing 70, it is possible to prevent simultaneous failure of the first to third inductive sensors 41 to 43 due to the conductive foreign object. Therefore, the brake pedal device 10 can prevent simultaneous failure of the plurality of inductive sensors 41 to 43 to ensure redundancy of sensor output signals, and the ECU 20 can accurately detect the pedal operation amount.

In addition, in the configuration of the fourth embodiment, a magnetic sensor 40 may be installed instead of one of the first to third inductive sensors 41 to 43.

Fifth to Seventh Embodiments

In the fifth to seventh embodiments, the configuration of a brake system 1 is changed with respect to the first to fourth embodiments described above. In the fifth to seventh embodiments, a brake pedal device 10 is described as having one magnetic sensor 40 and two inductive sensors 41 and 42, but the present disclosure is not limited to such configuration. Also, in the fifth to seventh embodiments, the brake pedal device 10 may be provided with three inductive sensors 41 to 43, for example.

Fifth Embodiment

Figure 17:
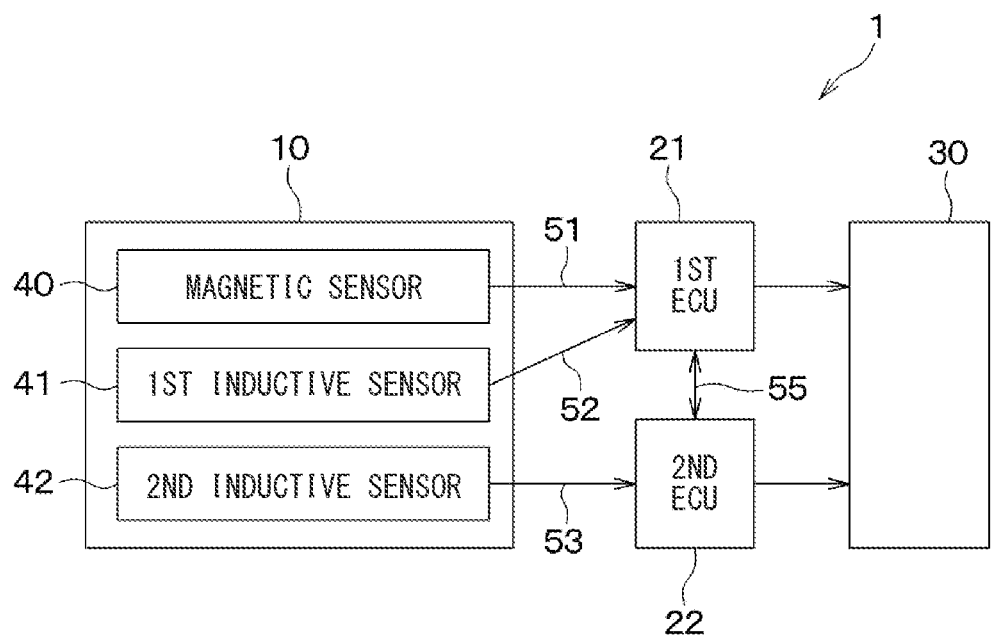
FIG. 17 is a block diagram of a schematic configuration of a brake system according to a fifth embodiment.

As shown in FIG. 17, a brake system 1 of the fifth embodiment includes a first ECU 21 and a second ECU 22. The magnetic sensor 40 and the first ECU 21 are connected by a first signal line 51. The first inductive sensor 41 and the first ECU 21 are connected by a second signal line 52. The second inductive sensor 42 and the second ECU 22 are connected by a third signal line 53. Therefore, the output signal of the magnetic sensor 40 and the output signal of the first inductive sensor 41 are input to the first ECU 21. On the other hand, the output signal of the second inductive sensor 42 is input to the second ECU 22.

The first ECU 21 and the second ECU 22 are connected through an in-vehicle LAN such as CAN (Controller Area Network) communication serving as a signal transmission unit 55, thereby enabling two-way communication therebetween.

Therefore, the output signals of the magnetic sensor 40 and the first inductive sensor 41 input to the first ECU 21 are transmitted to the second ECU 22 via the signal transmission unit 55. In addition, the output signal of the second inductive sensor 42 input to the second ECU 22 is transmitted to the first ECU 21 via the signal transmission unit 55. Therefore, the first ECU 21 and the second ECU 22 can each detect an accurate pedal operation amount based on the output signals of the three sensors 40 to 42 described above, and can drive-control the brake circuit 30.

The brake system 1 of the fifth embodiment described above is configured such that the output signal of at least one of the plurality of sensors 40 to 42 is directly input to each of the first ECU 21 and the second ECU 22 via a signal line. Therefore, even if one of the first ECU 21 and the second ECU 22 fails, the brake system 1 can operate the brake circuit 30 using the other ECU. Therefore, the brake system 1 can ensure the redundancy of the output signal of the sensor as well as the redundancy of the ECU.

The brake system 1 of the fifth embodiment also has three sensors 40 to 42, like the brake system 1 described in the first embodiment. Therefore, the brake system 1 of the fifth embodiment also ensures redundancy of the output signals of the sensors 40 to 42, and the pedal operation amount is accurately detectable in the ECU 20.

Sixth Embodiment

Figure 18:
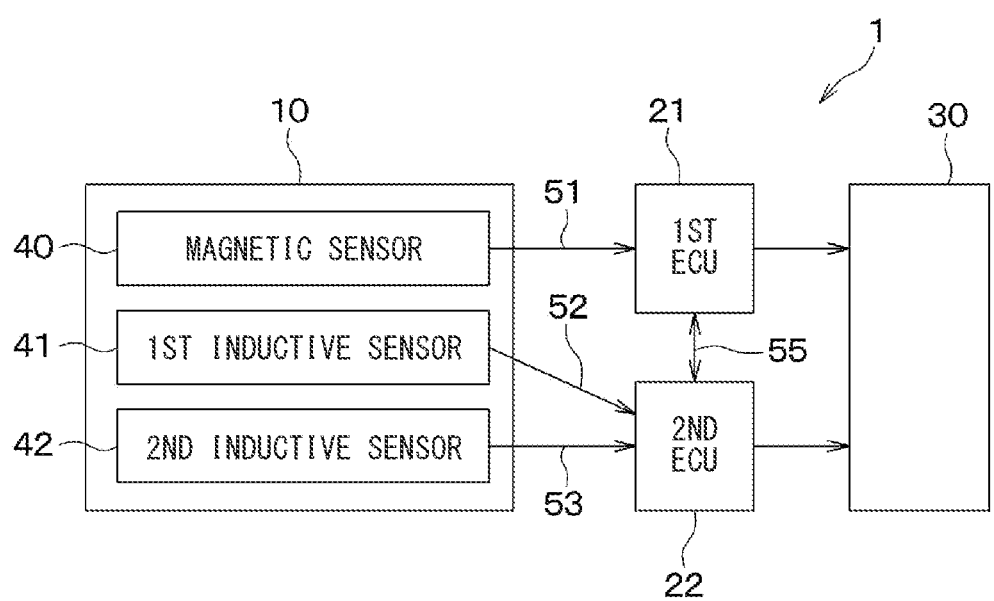
FIG. 18 is a block diagram of a schematic configuration of a brake system according to a sixth embodiment.

As shown in FIG. 18, the brake system 1 of the sixth embodiment also includes a first ECU 21 and a second ECU 22. The magnetic sensor 40 and the first ECU 21 are connected by the first signal line 51. The first inductive sensor 41 and the second ECU 22 are connected by the second signal line 52, and the second inductive sensor 42 and the second ECU 22 are connected by the third signal line 53. Therefore, the output signal of the magnetic sensor 40 is input to the first ECU 21. On the other hand, the output signal of the first inductive sensor 41 and the output signal of the second inductive sensor 42 are input to the second ECU 22.

The first ECU 21 and the second ECU 22 are connected through an in-vehicle LAN such as CAN communication serving as the signal transmission unit 55, thereby enabling two-way communication therebetween. Therefore, the output signal of the magnetic sensor 40 input to the first ECU 21 is transmitted to the second ECU 22 via the signal transmission unit 55. Further, the output signals of the first inductive sensor 41 and the second inductive sensor 42 input to the second ECU 22 are transmitted to the first ECU 21 via the signal transmission unit 55. Therefore, the first ECU 21 and the second ECU 22 can each detect an accurate pedal operation amount based on the output signals of the three sensors 40 to 42 described above, and can drive-control the brake circuit 30.

The brake system 1 of the sixth embodiment described above is also configured such that the output signal of at least one of the plurality of sensors 40 to 42 is directly input to each of the first ECU 21 and the second ECU 22 via a signal line.

Therefore, the brake system 1 of the sixth embodiment can also achieve the same effects as those of the fifth embodiment.

Seventh Embodiment

Figure 19:
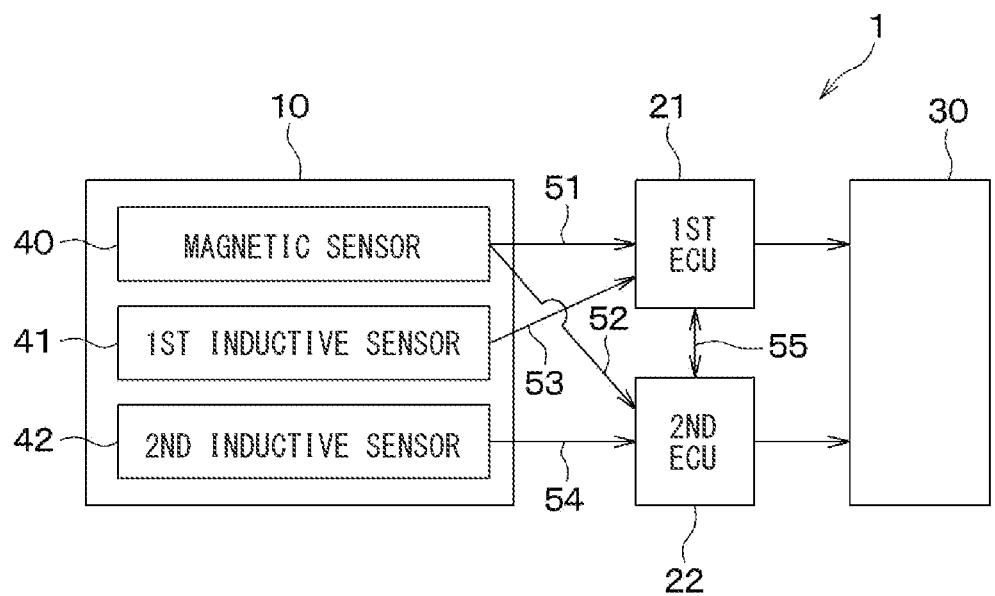
FIG. 19 is a block diagram of a schematic configuration of a brake system according to a seventh embodiment.
Figure 20:
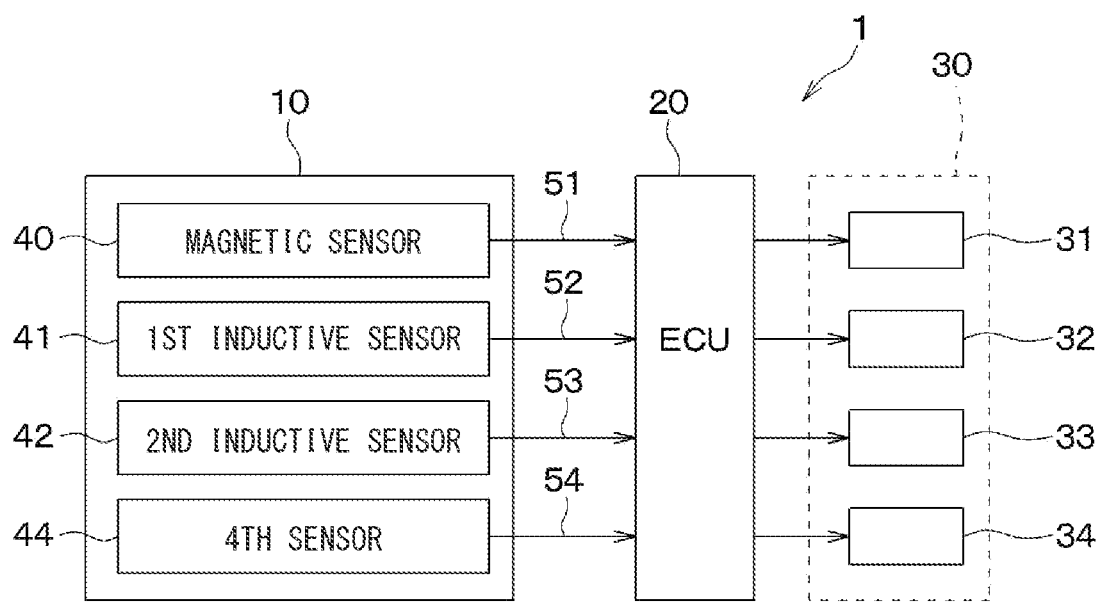
FIG. 20 is a block diagram of a schematic configuration of a brake system according to an eighth embodiment.

As shown in FIG. 19, a brake system 1 of the seventh embodiment also includes a first ECU 21 and a second ECU 22. In seventh embodiment, the output signal of a magnetic sensor 40 is divided into a first separation signal and a second separation signal, and is input into the first ECU 21 and the second ECU 22. Specifically, the magnetic sensor 40 and the first ECU 21 are connected by a first signal line 51. The magnetic sensor 40 and the second ECU 22 are connected by a second signal line 52. Thereby, the output signal of the magnetic sensor 40 is divided into the first separation signal and the second separation signal, the first separation signal is input to the first ECU 21, and the second separation signal is input to the second ECU 22. Note that the first separation signal input to the first ECU 21 and the second separation signal input to the second ECU 22 may have the same value that is derived or separated from an output signal detected by a pair of magnetic circuit unit and a magnetic detection unit arranged in one magnetic sensor 40. Alternatively, the first separation signal input to the first ECU 21 and the second separation signal input to the second ECU 22 may be two output signals that are detected by two pairs of a magnetic circuit unit and a magnetic detection unit arranged in one magnetic sensor 40.

Also, the first inductive sensor 41 and the first ECU 21 are connected by a third signal line 53. The second inductive sensor 42 and the second ECU 22 are connected by a fourth signal line 54. Therefore, (i) the first separation signal obtained by separating the output signal of the magnetic sensor 40 and (ii) the output signal of the first inductive sensor 41 are input to the first ECU 21. On the other hand, (iii) the second separation signal obtained by separating the output signal of the magnetic sensor 40 and (iv) the output signal of the second inductive sensor 42 are input to the second ECU 22.

The first ECU 21 and the second ECU 22 are connected through an in-vehicle LAN such as CAN communication serving as the signal transmission unit 55, thereby enabling two-way communication therebetween. Therefore, the first separation signal of the magnetic sensor 40 and the output signal of the first inductive sensor 41 input to the first ECU 21 are transmitted to the second ECU 22 via the signal transmission unit 55. Also, the second separation signal of the magnetic sensor 40 and the output signal of the second inductive sensor 42 input to the second ECU 22 are transmitted to the first ECU 21 via the signal transmission unit 55. Therefore, the first ECU 21 and the second ECU 22 can each detect an accurate pedal operation amount based on the output signals of the three sensors described above, and can drive-control the brake circuit 30.

In the brake system 1 of the seventh embodiment described above has a configuration, in which the output signal of the magnetic sensor 40 is divided into the first separation signal and the second separated signal, the first separation signal is input to the first ECU 21, and the second separated signal is input to the second ECU 22. According to the above, the first separation signal input to the first ECU 21 and the second separation signal input to the second ECU 22 have the same value. However, in case that the first ECU 21 is normal and the second ECU 22 has failed, the first ECU 21 may detect the first separation signal as a normal value, and the second ECU 22 may detect the second separation signal as an abnormal value. In such case, the first ECU 21 determines that the signals of the three sensors including the first separation signal are normal, and the second ECU 22 determines that the second separation signal of the magnetic sensor 40 is abnormal. Even in such case, the determination result of the first ECU 21 and the determination result of the second ECU 22 are compared, and the brake circuit 30 is operated by the first ECU 21 assuming that an abnormality has occurred in the second ECU 22 or the magnetic sensor 40. Therefore, the brake system 1 of the seventh embodiment can detect an abnormality in the first ECU 21 or the second ECU 22.

Eighth Embodiment

The eighth embodiment will be described in the following. In the eighth embodiment, a brake pedal device 10 is provided with a fourth sensor 44 in contrast to the first to seventh embodiments. The fourth sensor 44 may be, for example, a magnetic sensor or an inductive sensor. Alternatively, the fourth sensor 44 may be, for example, a force sensor that detects the pedaling force applied to the brake pedal 60 by the driver, a switch sensor that detects only whether the brake pedal 60 is being pedaled, a motion sensor that observes a driver's action or the like.

A fourth signal line 54 connects the fourth sensor 44 and the ECU 20. Therefore, the output signal of the fourth sensor 44 is input to the ECU 20. The output signal of the magnetic sensor 40 and the output signals of the two inductive sensors 41 and 42 are also input to the ECU 20.

Also in the eighth embodiment, the ECU 20 is configured to obtain the pedal operation amount by comparing the output signals of the three sensors 40 to 42 and the output signal of the fourth sensor 44. In such case, the ECU 20 may determine a signal, among the output signals of the three sensors 40 to 42, that has a large divergence from the output signal of the fourth sensor 44 as an abnormal signal.

Alternatively, when a switch sensor is adopted as the fourth sensor 44, the ECU 20 may start detecting the operation amount of the brake pedal 60 using the three sensors 40 to 42 according to the output signal of the fourth sensor 44. According to the above configuration, the detection load of the ECU 20 is reducible.

Alternatively, when a motion sensor is adopted as the fourth sensor 44, the ECU 20 may adjust, while detecting the operation amount of the brake pedal 60 using the three sensors 40 to 42, the braking force for the vehicle by the brake circuit 30 according to the output signal of the fourth sensor 44.

Note that, in the eighth embodiment, the brake pedal device 10 has been described as including one magnetic sensor 40, the two inductive sensors 41 and 42, and the fourth sensor 44. However, the present disclosure is not limited to such configuration. The brake pedal device 10 may include, for example, three inductive sensors 41 to 43 and a fourth sensor 44.

Other Embodiments (1) In each of the above embodiments, an organ-type brake pedal device has been described as an example of the brake pedal device 10. However, the present disclosure is not limited thereto. The brake pedal device 10 may be, for example, a pendant-type brake pedal device. The pendant-type brake pedal device 10 is a device in which a portion of the brake pedal 60 that is pedaled by the driver is arranged below the axial center CL of swing in the vertical direction when implemented on the vehicle.

(2) In each of the above embodiments, the electric brakes 31 to 34 have been described as an example of the brake circuit 30 provided in the brake system 1. However, the present disclosure is not limited to this. The brake circuit 30 may adopt a configuration in which, for example, a hydraulic pump or a master cylinder operates to increase the hydraulic pressure of the brake fluid to drive the wheel cylinders arranged on each wheel to operate the brake pads.

(3) In each of the above embodiments, the inductive sensor is provided on the side surface of the housing or in the sealed space inside the housing. However, the inductive sensor may have a detection range provided as a labyrinth structure.

The present disclosure is not limited to the above-described embodiments, and can be appropriately modified. The above-described embodiments are not irrelevant to each other, and can be appropriately combined together except when the combination is obviously impossible. Further, individual elements or features of a particular embodiment are not necessarily essential unless it is specifically stated that the elements or the features are essential in the foregoing description, or unless the elements or the features are obviously essential in principle. Further, in each of the embodiments described above, when numerals such as the number, numerical value, quantity, range, and the like of the constituent elements of the embodiment are referred to, except in case (a) where the numerals are expressly indispensable in particular, and (b) where the numerals are obviously limited to a specific number in principle, and the like, the present disclosure is not limited to the specific number. A shape, positional relationship or the like of a structural element, which is referred to in the embodiments described above, is not limited to the described shape, positional relationship or the like, unless it is specifically described or obviously necessary to be limited in principle.

The control unit and the method thereof described in the present disclosure are implemented by a dedicated computer provided by configuring a processor and a memory programmed to execute one or more functions embodied by a computer program. Alternatively, the control unit and the method described in the present disclosure may be implemented by a dedicated computer provided by configuring a processor with one or more dedicated hardware logic circuits. Alternatively, the control unit and the method thereof described in the present disclosure may be implemented by one or more special purpose computers provided as a combination of (i) a processor programmed to perform one or more functions by executing a computer program and a memory and (ii) a processor with one or more dedicated hardware logic circuits. The computer programs may be stored, as instructions to be executed by a computer, in a tangible, non-transitory computer-readable medium.

What is claimed is:

1. A brake pedal device used for a brake system in which an electronic control unit is configured to detect an operation amount of a brake pedal based on an output signal of a sensor group provided in the brake pedal device, and to control a drive of a brake circuit, the brake pedal device comprising:
   a housing to be fixed to a vehicle;
   the brake pedal provided to be swingable about a predetermined axis with respect to the housing, and to receive a depression operation of a driver; and
   at least three sensors configured to output signals according to the operation amount of the brake pedal, wherein
   the at least three sensors include at least one magnetic sensor and at least two inductive sensors,
   the magnetic sensor includes a magnetic circuit configured to operate together with the brake pedal, and a magnetic detector configured to detect changes in a magnetic field generated by the magnetic circuit,
   each of the at least two inductive sensors includes a target metal that moves together with the brake pedal, and a sensing coil configured to detect a movement of the target metal, and
   the at least two inductive sensors are spaced from each other such that the movement of the target metal of one inductive sensor is detected by the sensing coil of the one inductive sensor but the movement of the target metal of any other inductive sensors is not detected by the sensing coil of the one inductive sensor.

2. A brake pedal device used for a brake system in which an electronic control unit is configured to detect an operation amount of a brake pedal based on an output signal of a sensor group provided in the brake pedal device, and is configured to control a drive of a brake circuit, the brake pedal device comprising:
   a housing to be fixed to a vehicle;
   a brake pedal provided to be swingable about a predetermined axis with respect to the housing and to receive a depression operation of a driver; and
   at least three sensors configured to output signals according to the operation amount of the brake pedal, wherein
   the at least three sensors include at least three inductive sensors,
   each of the at least three inductive sensors includes a target metal that moves together with the brake pedal, and a sensing coil configured to detect a movement of the target metal, and
   the at least three inductive sensors are spaced from each other such that the movement of the target metal of one inductive sensor is detected by the sensing coil of the one inductive sensor but the movement of the target metal of any other inductive sensors is not detected by the sensing coil of the one inductive sensor.

3. The brake pedal device of claim 1, wherein
   the sensing coil of the one inductive sensor is provided at a first side surface of the housing, facing one axial direction of the predetermined axis, and
   the sensing coil of an another inductive sensor other than the one inductive sensor is provided at a second side surface of the housing, facing the other axial direction of the predetermined axis.

4. The brake pedal device of claim 1, wherein
   the target metal and the sensing coil of the inductive sensor are provided with a sealed space inside the housing, to prevent a foreign object from entering.

5. The brake pedal device of claim 1, wherein
   the inductive sensor is configured to detect a swing angle of the brake pedal with respect to the housing.

6. The brake pedal device of claim 2, wherein
   the sensing coil of the one inductive sensor is provided at a first side surface of the housing, facing one axial direction of the predetermined axis, and
   the sensing coil of an another inductive sensor other than the one inductive sensor is provided at a second side surface of the housing, facing the other axial direction of the predetermined axis.

7. The brake pedal device of claim 2, wherein
the target metal and the sensing coil of the inductive sensor are provided with a sealed space inside the housing, to prevent a foreign object from entering.

8. The brake pedal device of claim 2, wherein
the inductive sensor is configured to detect a swing angle of the brake pedal with respect to the housing.

9. A brake system driving and controlling a brake circuit that performs braking of a vehicle, the brake system comprising:
a brake pedal device including
a housing to be fixed to the vehicle;
a brake pedal provided to be swingable about a predetermined axis with respect to the housing, and to be pedaled by a driver; and
at least three sensors configured to output signals according to an operation amount of the brake pedal, and
a controller configured to detect the operation amount of the brake pedal based on output signals of the at least three sensors and to control of a drive of the brake circuit, wherein
the at least three sensors include (i) at least one magnetic sensor and at least two inductive sensors, or (ii) at least three inductive sensors, and
the inductive sensors are spaced from each other such that a movement of a target metal of one inductive sensor is detected by a sensing coil of the one inductive sensor but a movement of a target metal of any other inductive sensors is not detected by the sensing coil of the one inductive sensor.

10. The brake system of claim 9, wherein
the controller includes a first electronic control unit and a second electronic control unit,
the at least three sensors include a predetermined sensor and other sensors other than the predetermined sensor,
the predetermined sensor is configured to output an output signal of the predetermined sensor to the first electronic control unit,
the other sensors other than the predetermined sensor are configured to output an output signal to the second electronic control unit, and
the first electronic control unit and the second electronic control unit are configured to bi-directionally communicate the output signal of the sensors between the first electronic control unit and the second electronic control unit.

11. The brake system of claim 10, wherein
the output signal of the magnetic sensor is divided into a first separation signal and a second separated signal, and
the first separation signal is input to the first electronic control unit and the second separation signal is input to the second electronic control unit.

12. The brake system of claim 9, wherein
when signals respectively input to the controller from the three sensors and respectively converted according to output characteristics of each sensor to have a value comparable to each other are designated as a first sensor signal, a second sensor signal, and a third sensor signal,
the controller is configured to detect the operation amount of the brake pedal, (i) by comparing a difference value between the first sensor signal and the second sensor signal, a difference value between the first sensor signal and the third sensor signal, and a difference value between the second sensor signal and the third sensor signal, and (ii) by using the two sensor signals yielding a smallest difference value among the three difference values, as normal values.

13. The brake system of claim 9, wherein
when signals respectively input to the controller from the three sensors and respectively converted according to output characteristics of each sensor to have a value comparable to each other are designated as a first sensor signal, a second sensor signal, and a third sensor signal,
the controller is configured to determine, as a normal signal, a sensor signal having an intermediate value, which is derived by excluding signals having a maximum value and having a minimum value from the three signals, in case that three sensor signals are respectively different.

14. The brake system of claim 9, wherein
when signals respectively input to the controller from the three sensors and respectively converted according to output characteristics of each sensor to have a value comparable to each other are designated as a first sensor signal, a second sensor signal, and a third sensor signal,
the controller is configured
to determine whether a reference range defined based on one of three sensor signals by adding a first predetermined value thereto and subtracting a second predetermined value therefrom includes other two signals of the three signals,
to determine all of the three signals as normal signals, in a case where other two signals fall within the reference range,
to determine (i) the one of the other two signals falling within the reference range and the one of the three signals used for defining the reference range as normal signals, and (ii) the signal not falling within the reference range as an abnormal signal, in a case where one of other two signals falls within the reference range, and
to determines (i) the other two signals not falling within the reference range as normal signals, and (ii) the one of the three signals used for defining the reference range as an abnormal signal, in a case where none of other two signals falls within the reference range.

15. The brake system of claim 9, wherein
the brake pedal device includes, in addition to the at least three sensors, a fourth sensor configured to output a signal corresponding to the operation amount of the brake pedal, and
the controller is configured to obtain the operation amount of the brake pedal by comparing the output signals of the at least three signals and the output signal of the fourth sensor.

* * * * *